US012567314B2

(12) United States Patent
Brody

(10) Patent No.: US 12,567,314 B2
(45) Date of Patent: *Mar. 3, 2026

(54) THREE-CARD MONTE VARIANT WITH SECONDARY SYMBOLS

(71) Applicant: Steven Joseph Brody, Las Vegas, NV (US)

(72) Inventor: Steven Joseph Brody, Las Vegas, NV (US)

( * ) Notice: Subject to any disclaimer, the term of this patent is extended or adjusted under 35 U.S.C. 154(b) by 320 days.

This patent is subject to a terminal disclaimer.

(21) Appl. No.: 18/223,991

(22) Filed: Jul. 19, 2023

(65) Prior Publication Data

US 2023/0377422 A1 Nov. 23, 2023

Related U.S. Application Data

(63) Continuation-in-part of application No. 17/185,943, filed on Feb. 25, 2021, now Pat. No. 11,749,065.

(51) Int. Cl.
*G07F 17/32* (2006.01)

(52) U.S. Cl.
CPC ...... *G07F 17/3267* (2013.01); *G07F 17/3293* (2013.01)

(58) Field of Classification Search
CPC .. G07F 17/3293; A63F 1/00; A63F 2001/001; A63F 2001/003; A63F 2001/005; A63F 2001/006; A63F 2001/008
See application file for complete search history.

(56) References Cited

U.S. PATENT DOCUMENTS

| | | | |
|---|---|---|---|
| 5,362,064 A | 11/1994 | Lofink et al. | |
| 5,979,896 A | 11/1999 | Lofink et al. | |
| 6,227,969 B1 | 5/2001 | Yoseloff | |
| 6,585,586 B1 | 7/2003 | Romero | |
| 7,594,850 B2 | 9/2009 | Baerlocher et al. | |
| 8,449,375 B2 | 5/2013 | Oberberger | |
| 8,734,260 B2 | 5/2014 | Pececnik | |
| 10,134,235 B2 | 11/2018 | Litman | |
| 10,217,314 B2 | 2/2019 | Thomas et al. | |
| 10,311,681 B2 | 6/2019 | Litman | |
| 10,410,469 B2 | 9/2019 | Pettie | |
| 10,529,192 B2 | 1/2020 | Stream | |
| 10,870,059 B1 | 12/2020 | Litman | |
| 11,749,065 B2 * | 9/2023 | Brody | G07F 17/3267 463/11 |
| 2003/0087686 A1 | 5/2003 | Yu et al. | |
| 2003/0199297 A1 | 10/2003 | Falciglia | |

(Continued)

*Primary Examiner* — Milap Shah
(74) *Attorney, Agent, or Firm* — Eric Kohli

(57) ABSTRACT

A system for providing a game table. A deck of cards and a gaming table is provided. The gaming table comprises a surface having three card-placement areas and a plurality of user-playing areas. Each of the card-placement areas is configured to receive at least one of the cards. Each of the user-playing areas comprises three card-placement indicators configured to associate with one of the card-placement areas and a wagering indicator configured to associate a credit value with at least one of the card-placement areas. A symbol generation apparatus configured to randomly generate a symbol is provided. The symbol randomly generated by the symbol generation apparatus is associated with one of the card-placement areas.

17 Claims, 15 Drawing Sheets

(56) References Cited

U.S. PATENT DOCUMENTS

| | | | | |
|---|---|---|---|---|
| 2005/0014549 | A1* | 1/2005 | Baerlocher | G07F 17/32 463/16 |
| 2005/0054411 | A1 | 3/2005 | Hughs-Baird et al. | |
| 2006/0082064 | A1 | 4/2006 | Caterinicchio et al. | |
| 2008/0122177 | A1 | 5/2008 | Kling et al. | |
| 2009/0186675 | A1* | 7/2009 | Elias | G07F 17/32 463/11 |
| 2009/0189351 | A1 | 7/2009 | Baerlocher et al. | |
| 2010/0016051 | A1 | 1/2010 | Nicely | |
| 2010/0066018 | A1 | 3/2010 | Moss | |
| 2010/0117300 | A1* | 5/2010 | Templeman | G07F 17/32 463/16 |
| 2013/0017875 | A1 | 1/2013 | Capone et al. | |
| 2014/0031105 | A1 | 1/2014 | Givant | |
| 2014/0298355 | A1 | 10/2014 | Kim et al. | |
| 2018/0018856 | A1 | 1/2018 | Blazevic | |
| 2019/0244475 | A1 | 8/2019 | Merati | |
| 2020/0005585 | A1 | 1/2020 | Chun | |
| 2021/0090407 | A1 | 3/2021 | Lamle | |

* cited by examiner

THREE-CARD MONTE VARIANT WITH SECONDARY SYMBOLS

CROSS-REFERENCE TO RELATED APPLICATION

This application is a continuation-in-part of U.S. patent application Ser. No. 17/185,943 filed on Feb. 25, 2021, the entire disclosure of which is incorporated herein by reference for all purposes.

BACKGROUND

Field of the Invention

The present invention relates to execution of wagering games using playing cards or playing card symbols performed with an electronic system that enables fair play of types of gaming events that have traditionally required dishonesty or deception to provide an advantage of the house or dealer.

Background of the Art

Playing cards of various types have been used for centuries to implement wagering events and competitions. Playing cards have generally evolved into what is referred to as a standard playing card deck in which there are 52 playing cards divided into thirteen playing cards each (A, 2, 3, 4, 5, 6, 7, 8, 9, 10, J, Q and K) in four different suits (such as Spades, Hearts, Diamonds and Clubs). One or two Jokers or special cards may also be provided with the basic standard set of 52 playing cards.

Wagering games executed by a dealer, a gaming facility (house) or casino (physical or virtual) have built-in advantages for the house so that honest games can be played with the house still statistically assured of a long range advantage and a profit in providing the wagering game. House advantages in various games and specific wagers may vary between as low as 0.08% to as much as 90%, with jurisdictions often limiting house advantages on individual wagers to amounts such as 20% or 25%. Some "street games" or carnival games (carny games) can be executed by dealers that manipulate the cards to reduce or even eliminate any probability for the player to win on a wager. One of the more well-known street games has been variations of Three-Card Monte, which can be played with three playing cards, or was originally played with three semicircular shells with a token (ball, pea, etc.) hidden under one of the shells. The dealer rapidly shifts and changes positions of the playing cards or the shells and then offers a player to wager on locating the token under a specific shell or one of the three specific playing cards. The fact that the dealer in these types of street games has practiced physical skills in rapidly altering card positions, moving shell positions and even palming cards or the token enables the dealer to prevent players from winning their wagers even when players believe they have carefully followed the dealer's hand movement of the shells or the playing cards. The fact that the games can be rigged in favor of the dealer has given rise to the common term of "shell game" for any financial activity in which the player is significantly or completely disadvantaged. This type of game has not lent itself to legal commercial operation in gaming facilities because of the reputation for dishonesty in the game, the need for near perfect skill execution by players, the ability of dealers to act in collusion with players against the gaming facility, and other technical issues involved in creating an enjoyable game with a reasonable house advantage.

One attempt at a game in which players attempt to identify locations of specific symbols is the common game of "Concentration" in which multiple pairs of images on playing cards are disposed face down on a surface and players in turn expose two cards from the disposed playing cards, and collecting pairs of cards when the images are identical. U.S. Pat. No. 6,695,311 (Yu) discloses a game including game pieces and rules for playing a game for a plurality of players, the goal of which is to score the most points by correctly guessing the location of hidden items. The invention provides multiple coverable items, multiple sets of markers, and multiple shells. Multiple coverable items may be hidden under multiple shells in a manner such that multiple sets of markers may be used to guess the location of the corresponding coverable items by stacking a marker onto the corresponding shell.

Many games are now executed on gaming systems which include at least some electronics for assisting wagering or for disclosing images of playing cards during execution of wagering events.

Examples of such electronic wagering events include, but are not limited to systems as shown in U.S. Pat. No. 9,373,220 (Yoseloff); U.S. Pat. Nos. 7,933,444; 6,712,696; 6,688,979; 6,685,568 (Soltys); PCT Applications PCT/US2014/052566 (Blazevic); PCT/US2014/038887 (Blazevic); PCT/US16/029307 (Blazevic) and the like. All patent references cited herein are incorporated by reference in their entireties.

An example of a Three-Card Monte electronic game is found in Published UIS Patent Document No. 20180018856 (Blasevic) which describes a playing card reading device or an electronic gaming machine. At least three playing cards (or virtual playing cards) are read and randomly placed on a gaming table. One automatically read card is display (without indication of its location) on a display screen. Player wagers are made based on correspondence with properties of the displayed card.

SUMMARY OF THE INVENTION

In one embodiment, a gaming system comprises a deck of cards, each card in said deck having a rank; a gaming table comprising a surface having three card-placement areas and a plurality of user-playing areas; and a symbol generation apparatus configured to randomly generate a symbol associated with one of the card-placement areas.

In one embodiment, each of the three card-placement areas is configured to receive at least one of the cards face-down.

In one embodiment, each of the user-playing areas comprises three card-placement indicators and a wagering indicator. Each card-placement indicator is uniquely associated with one of the card-placement areas and the wagering indicator is configured to associate a credit value with at least one of the card-placement areas.

In one embodiment, the gaming table is configured to allow a user to select one of the card-placement areas by interacting with the card-placement indicators and provide a credit value associated with the selected card-placement area by interacting with the wagering indicator.

In one embodiment, the gaming table is configured to provide a rank of the card placed on the card-placement area associated with the symbol and allow the user to either keep said credit value the same or increase the credit value by interfacing with the wagering indicator.

In one embodiment, the gaming table is further configured to provide an award value for the user. The award value is determined by comparing the rank of the card associated with the symbol with the rank of each of the two other cards.

In one embodiment, the deck of cards comprises a standard deck of fifty-two cards.

In one embodiment, the symbols are non-numeric symbols.

In one embodiment, the symbols are colors.

In one embodiment, the symbol generation apparatus is a die.

In one embodiment, the symbol generation apparatus is a spinning wheel.

In one embodiment, the symbol generation apparatus is a digital screen. The symbol is displayed on the screen.

In one embodiment, the wagering indicator is configured to indicate that the credit value is either doubled or tripled.

In another embodiment, a method of providing a game comprises: providing a deck of cards, each card in said deck having a rank; providing a gaming table with a surface, the surface comprising three card-placement areas for positioning the cards and a plurality of user-playing areas having three card-placement indicator and a wagering indicator; providing at least one of the cards in each of the card-placement areas face-down; providing a first selectable option to a user, wherein the user is allowed to select one of the three card-placement areas by physically interacting with the card-placement indicators; providing a second selectable option to the user, wherein the user is allowed to provide a credit value associated with the selected card-placement area by physically interacting with the wagering indicator; generating a symbol associated with one of the card-placement areas, wherein the symbol is randomly generated by using a symbol generation apparatus; providing a rank of the card placed on the card-placement area associated with the symbol; providing a third selectable option to the user, wherein the user is allowed to either keep said credit value the same or increase said credit value by physically interfacing with the wagering indicator; providing a rank of each of the two remaining cards; and providing an award value to the user if the rank of the card associated with the symbol is higher than the rank of each of the two other cards.

In one embodiment, each of the card-placement indicators is uniquely associated with one of the card-placement areas.

DETAILED DESCRIPTION

Figure 1:
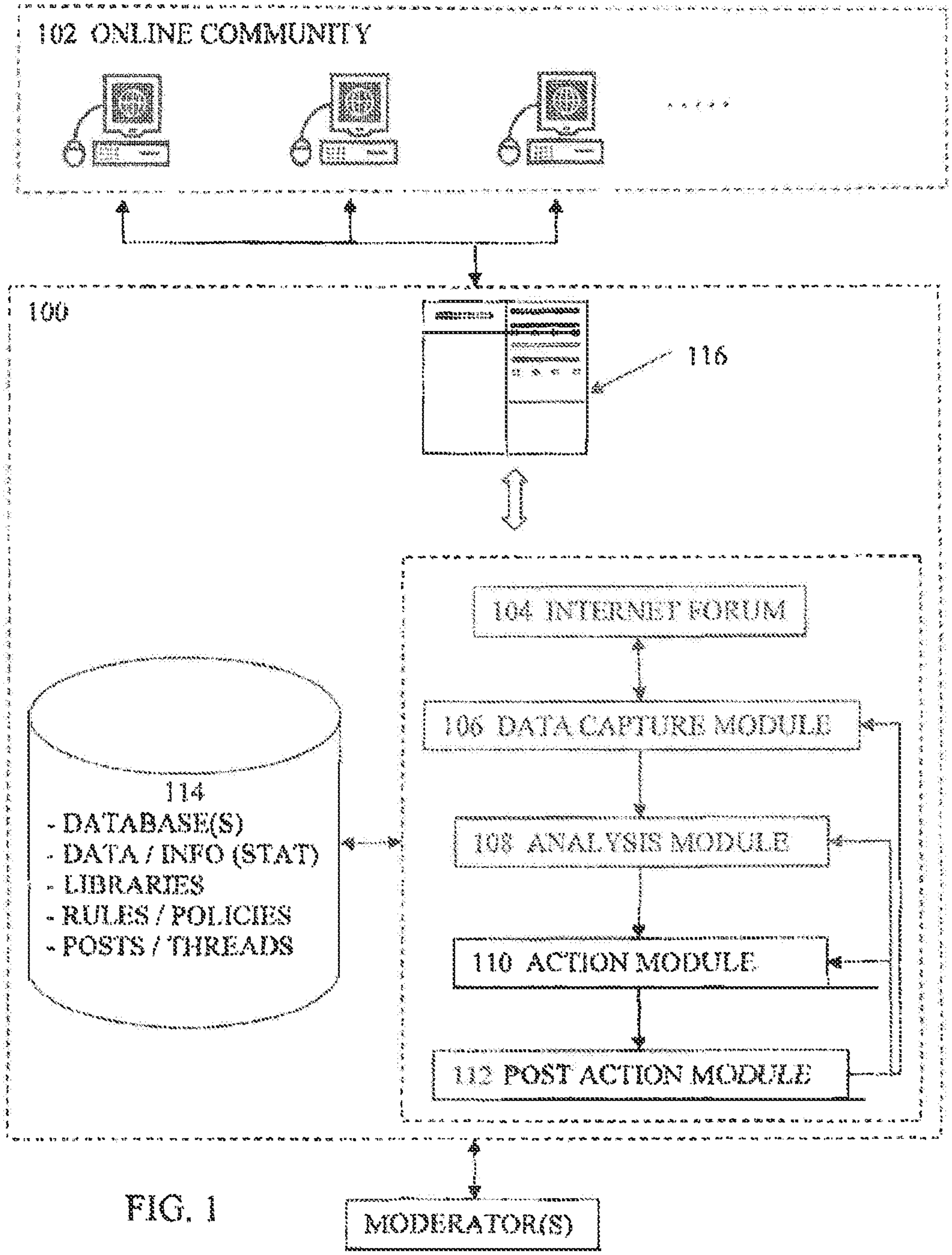
FIG. 1 illustrates a schematic configuration of a system or process for analyzing behavior of Internet forum participants.

A method of executing a competitive event using playing cards and a random symbol selector includes:

a) providing a random set of standard playing cards;
b) providing a gaming table surface with at least three distinct areas for positioning of playing cards on the gaming table surface;
c) a position adjacent each of the at least three distinct areas for identifying a symbol distinct from symbols on the playing cards;
d) providing a single playing card from the random set of standard playing cards face-down at each of the at least three distinct areas for positioning of playing cards on the gaming table surface;
e) a player identifying a single card position selected as a position having a playing card of the highest rank by the player by indicating a single one of the symbols distinct from symbols on the playing cards;
f) a random symbol indicator identifying a random only one of the symbols as a random outcome;
g) turning the single face-down playing card adjacent one of the at least three distinct areas for positioning of playing cards on the gaming table surface to expose a rank on of the single card;
h) turning over all remaining face-down ones of the at least three playing cards to expose a rank on each of the remaining face-down ones of the at least three playing cards; and
i) comparing ranks of all face-up playing cards on the gaming table and determining if the identified single card position has a highest rank among all face-up playing cards and identifying the player that identified the single playing card position as having a winning outcome in the competitive event.

The random symbol indicator identifying a random only one of the symbols as a random outcome is selected from the group consisting of i) a die having at least three different individual symbols on three faces of the die and the random symbol is determined by casting of the die; ii) a spinning wheel having spaces with the at least three random symbols displayed on the spinning wheel and a pointer and the random symbol is determined by spinning the wheel and the pointer identifying a single random symbol, and iii) an electronic random symbol generator comprising an electrically-powered display element and a random number generator wherein upon a result from the random number generator is displayed as a symbol on the electrically-powered display element.

The player identifies the single card position selected as the position having the playing card of the highest rank by the player placing a wager on a single one of the symbols distinct from symbols on the playing cards and the winning outcome in the competitive event is resolved by an award proportional to the placed wager.

The random indicator may identify a random only one of the symbols as a random outcome is a die having at least three different individual symbols on three faces of the die and the random symbol is determined by casting of the die.

The random indicator may identify a random only one of the symbols as a random outcome is a spinning wheel having spaces with the at least three random symbols displayed on the spinning wheel and a pointer and the random symbol is determined by spinning the wheel and the pointer identifying a single random symbol.

The playing cards may be virtual playing cards and the random indicator may identify a random only one of the symbols as a random outcome is an electronic random symbol generator comprising an electrically-powered display element and a random number generator wherein upon a result from the random number generator is displayed as a symbol on the electrically-powered display element.

The method may be executed on an electronic gaming machine comprising a housing, the electrically-powered display element, the random number generator and a ticket-in-ticket-out element having a ticket scanner and a ticket printer and a motor to advance tickets in and out of the electronic gaming machine.

An apparatus for executing the method may include a gaming table with a play surface, a set of randomized physical playing cards, an area identified on the play surface for placement of the at least three random playing cards and a random symbol indicator identifying a random only one of the symbols as a random outcome selected from the group consisting of i) a die having at least three different individual symbols on three faces of the die and the random symbol is determined by casting of the die; ii) a spinning wheel having spaces with the at least three random symbols displayed on the spinning wheel and a pointer and the random symbol is determined by spinning the wheel and the pointer identifying a single random symbol, and iii) an electronic random symbol generator comprising an electrically-powered display element and a random number generator wherein upon a result from the random number generator.

The method executing a wagering event supported by a non-wagering third party using at least one standard virtual deck of playing cards, the method including:

- providing at least one gaming network for the at least two player positions, the at least one gaming network comprising a game processor, the at least one display screen for each of the at least two player positions, at least one player input terminal at each display screen for each of the at least two player positions, a random number generator in communication with the game processor, memory storing image data of at least one standard deck of playing card including at least symbols of at least one deck of playing cards;
- the game processor recognizing at least two player positions placing value at risk as an ante wager,
- the game processor providing the at least three random playing cards as virtual playing cards.

One aspect of the invention is to pick which of three playing cards dealt will be the highest-ranked card of the three. The game may be played out of a 1-8 deck shoe and preferably as a six deck or 8 deck shoe of standard playing cards. (Standard playing card decks have 52 cards divided into four suits and thirteen ranks such as A, 2, 3, 4, 5, 6, 7, 8, 9, 10, Jack, Queen and King.

After the players have placed their wagers on their chosen card (marked with symbols or numbers having no import to the rank of the cards in the underlying gaming event), the dealer will randomly select one of the three cards to reveal (using a specialty marked die, wheel or an electronic RNG device). After the randomly selected card has been revealed, the player has the option to raise anywhere from 0×, 1×, 2× to 3× their initial ante wager.

After the player has raised (or not raised) their initial wager, the dealer will reveal the remaining two cards. Any wagers placed on the card that has the highest rank out of the three cards are paid I:I on both the initial bet and the amount raised. If two cards tie for the highest rank of the three, both wagers are paid even money. If all three cards tie, then all three wagers are paid even money. The player can make an optional 3-card poker side bet on the outcome of the three cards dealt in the game. When the game uses multiple decks, it might be possible to pay bonus awards for suited outcomes (like a suited pair or suited three of a kind).

| Hand | Pays (to 1) |
|---|---|
| Suited Three of a Kind | 150 |
| Straight Flush | 25 |
| Three of a Kind | 10 |
| Straight | 5 |
| Flush | 3 |
| Pair | 1 |

There are at least three apparatuses that could be used to determine which card to randomly reveal. A digital screen with an embedded RNG could randomly select and display one of the three symbols when activated through a touch-screen button or physical button. Another method would involve using a specially constructed die with the three symbols printed on the six sides. Still another apparatus would be a spinning wheel, like a roulette wheel or candy wheel with symbols randomly indicated.

One embodiment, described in more detail below as a "chipless gaming platform," the gaming device includes one or more display devices that are mounted into a gaming table surface and are controlled by the processor in addition to or separately from the individual player monitors. The display devices are preferably connected to or mounted into the table structure. This may include a central display device which displays a primary game, dealer images, jackpot information, or information that is not specifically related to the game, such as sports information or winning events at other tables. This display device may also display any suitable secondary game associated with the primary game as well as information relating to the primary or secondary game (e.g., side bets, bonuses, jackpots and the like).

An alternative embodiment may include a central horizontal game display device and a vertically oriented virtual dealer display device as in Shuffle Master, Inc.'s Table Master™ gaming system. The central display device may display the primary game, any suitable secondary game associated or not associated with the primary game and/or information relating to the primary or secondary game. These display devices may also serve as digital glass operable to advertise games or other aspects of the gaming establishment. The gaming device includes a credit display 20 which displays a player's current number of credits, cash, account balance, or the equivalent. In one embodiment, the gaming device includes a bet display displays a player's amount wagered. In one embodiment, as described in more detail below, the gaming device includes a player tracking display which displays information regarding a player's play tracking status.

In yet another embodiment, at least one display device may be a mobile display device, such as a PDA or tablet PC that enables play of at least a portion of the primary or secondary game at a location remote from the gaming device. The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism.

In one embodiment, as described in more detail below, the display device includes a touch screen with an associated touch-screen controller. The display devices may be of any suitable size and configuration, such as a square, a rectangle or an elongated rectangle. The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, images of dealers and the like. Other forms of the invention are in the form of game software that is implemented in a variety of formats, such as internet gaming, PC practice play, hand-held game devices, wireless gaming devices and the like.

Chipless Gaming Table Implementation

One enabling system useful in the practice of the present invention is the use of playing cards with Chinese domino symbols which can be distributed for use with a system marketed under the name i-TABLE™ by Shuffle Master, Inc. of Las Vegas, Nev. That system includes: a) a physical gaming table; b) player monitors at each player position; c) a playing card reading and delivery system (e.g., commercially available shufflers and playing card delivery shoes with reading capability as sold under the Trade names of One2Six™ shuffler, Ace™ shuffler, I-DEAL™ shuffler, I-SHOE™ delivery shoe, etc.); d) a processor receiving information (numbers of cards, rank of cards, suits of cards, etc.) from the card reading and delivery systems; e) communication connectivity (hardwired or wireless) between necessary combinations of the card reading/delivery systems and the processor, the processor and the individual player monitors, and/or the card reading/delivery systems and the video monitors; and f) software in the processor that defines predetermined advantage for distributions of playing cards into multiple hands, game execution events, hand history, and the like. In order to prevent a bet pattern exceeding the number of possible hands in a "live" shoe, a card count will be tracked and the remaining cards will be continually divided by six (the maximum number of cards for a hand).

With regard to software f), it is understood in the practice of the present technology that this is not complex software that reads individual player hand cards and determines advantageous card distributions for a first time by extensive calculations. Rather, the entire range of possibilities of hands (e.g., all possible five card sets dealt to players in poker-style games) is known in poker style games.

A preferable card handling device for administering a video reel-type-style game is a hand-forming shuffler with integrated card recognition technology, from which playing cards are supplied, with a least a rank/count (and preferable also suit) of individual packs of cards are known before the cards are removed and delivered to player positions and/or the banker position. The card delivery system 102 is in communication with the controller 128 by wired or wireless communication methods. Communication between the various system components is not limited to electronic or electrical signals, but may include optical signals, audio signals, magnetic transmission or the like.

The individual player position processors (not shown) are preferable graphics processors and not full content CPUs as a cost saving, space saving, and efficiency benefit. With the reduced capacity in the processor as compared to a CPU, there is actually reduced likelihood of tampering and fraudulent input.

FIG. 1 illustrates a high level architectural view of some embodiments directed to a system 100 for analyzing behavior of Internet forum participants analyzing behavior of Internet forum participants that interfaces with an online community 102. In one or more embodiments, the system 100 for analyzing behavior of Internet forum participants comprises a computing node 116 such as a computer or server that comprises or is programmed to interact with an internet forum 104 and a storage module 114 for storing data or information such as, but not limited to, database(s) for various types of data, various statistics, static and dynamic libraries of various applications, various rules and policies of the Internet forum, data or information of the posts and/or threads, etc. The storage module 114 may comprise a computer storage device, a volatile or non-volatile non-transitory computer readable storage medium, etc. More details of various forms of the storage module will be described in the System Architecture Overview section below. Communications between various computers shown in FIG. 1 are performed through respective networks. Each of the networks and other networks discussed herein (generally, network) may be different, or two or more networks may be the same depending on the system configuration and communication protocols employed. One or more or all of the networks may, for example, be a cellular network, a wireless network, a Local Area Network (LAN) and/or a Wide Area Network (WAN). Reference to a network generally is not intended to refer to a specific network or communications protocol, and embodiments can be implemented using various networks and combinations thereof.

In one or more embodiments, the computing node 116 in the system for analyzing behavior of Internet forum participants analyzing behavior of Internet forum participants further comprises or is further programmed to interact with a data capture module 106, which captures data or information from or related to the various posts and/or threads for analysis, and an analysis module 108, which analyzes the information or data to determine whether a certain post is of particular interest, and corresponding action(s) for the certain post if it determines that the post is of interest. The computing node 116 in the system for analyzing behavior of Internet forum participants further comprises or is further programmed to interact with an action module 110, which performs various actions determined by the analysis module, and optionally a post action module 112, which performs various other processes after the actions have been performed, in the single embodiment or in some embodiments.

The various modules 104-112 accesses and interacts with the storage module 114 for various data input and output. More details of the data capture module 106, the analysis module 108, the action module 110, and the post action module 112 will be described in subsequent paragraphs with reference to various figures.

In some embodiments, the action process or module 110 may further optionally comprise a process or module for creating and sending a report based on the results of the data capture module 106 or the analysis module 108 to the moderation team for review or approval. In these embodiments, the moderation team comprises one or more human moderators for human intervention purposes. In one or more embodiments, the report comprises relevant information or data concerning the various posts or threads that are of interest or that may be determined to be influential. In one or more embodiments, the report comprises recommendation or recommended actions for the moderation team's review, approval, or choice. In some embodiments where the method or system for analyzing behavior of Internet forum participants is having difficulties to determine or identify an appropriate course of action due to, for example but not limited to, lack of confidence, insufficient data, unknown data, conflicting data or information, etc., the method or the system may generate and forward a report with sufficient information to the moderation team such that the moderation team may make a determination.

For example, a report may present a plurality of recommended actions together with relevant information to the moderation team so that the moderation team may decide on the final action to be taken for a particular post or thread. In these embodiments, the human intervention prevents or reduces the possibilities of actions or consequences thereof due to, for example but not limited to, ambiguities, uncertainties, or insufficient data points to make a definitive or conclusive determination in various processes or modules in various embodiments disclosed herein. For example, the data capture process or module 106 may encounter ambiguities or uncertainties during the interpretation or data capturing of a particular post; the analysis process or module 108 may also encounter substantially equally weighed situations where two recommended actions result in different consequences or other circumstances where the cost function analysis, which will be described in subsequently paragraphs, results in substantially equally weighed cost function analysis results; or there may exist insufficient statistical data for the method or system to generate a recommended action with sufficient confidence level. In this example, the method or the system may furnish a report together with sufficient information concerning the posts, threads, or various analytical results to the moderation team to decide upon a final action to take on for this particular post.

Figure 1A:
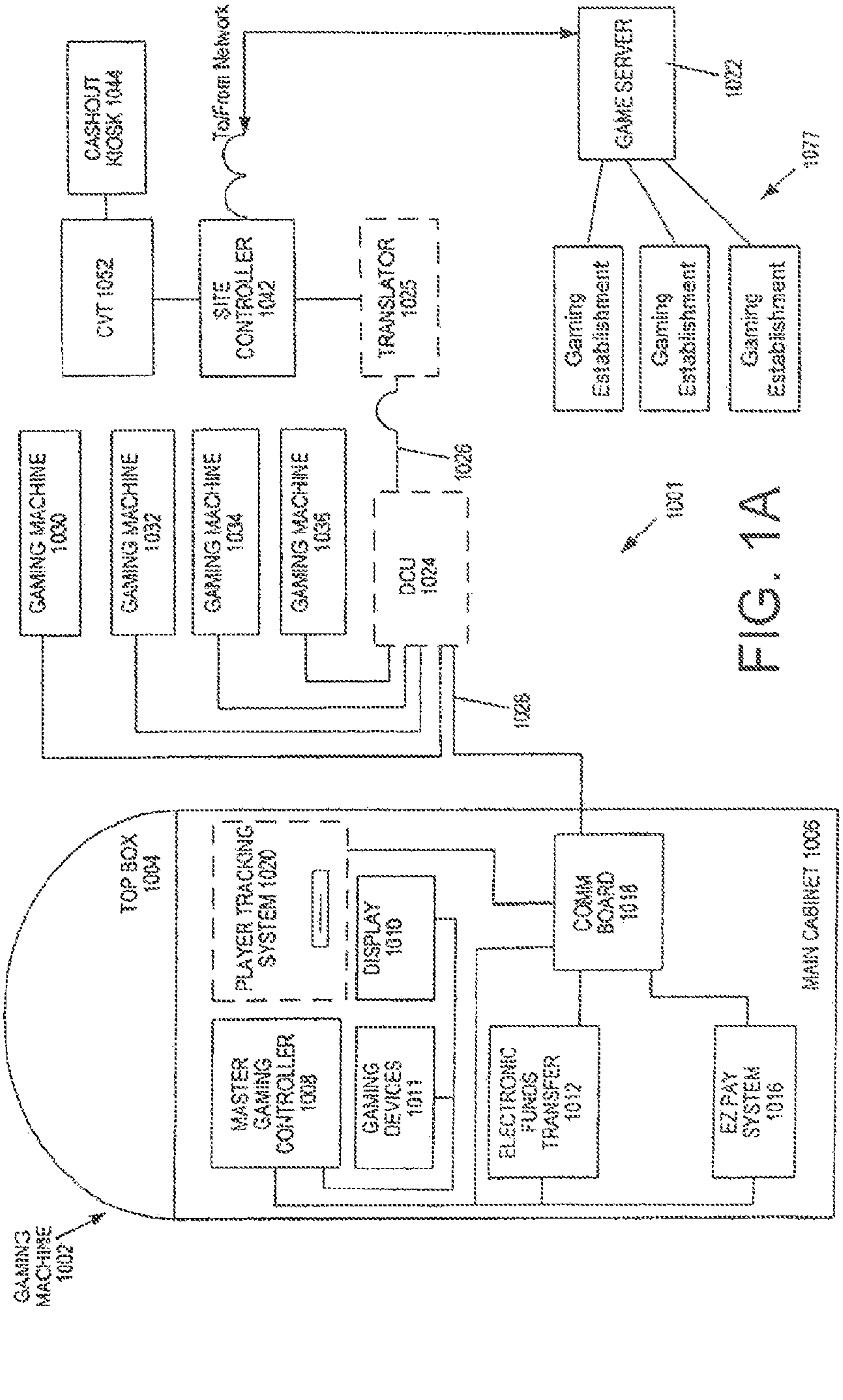
FIG. 1A shows a schematic for an electronic system for enabling play of the gaming method described herein.
Figure 1B:
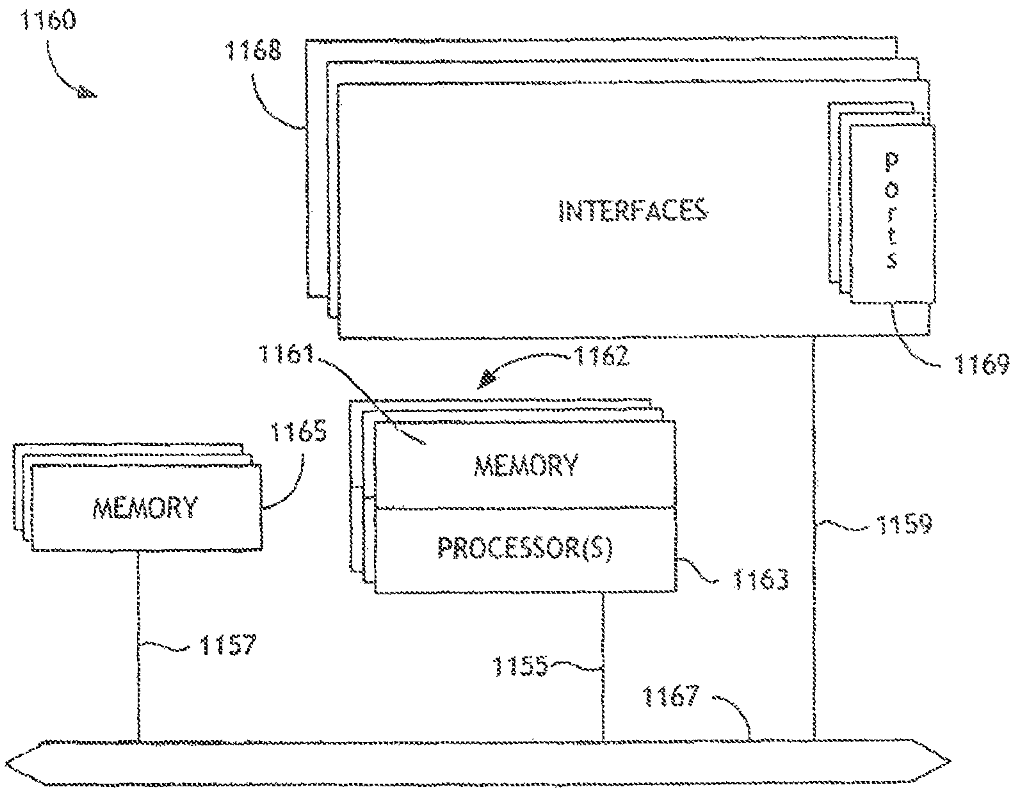
FIG. 1B shows another schematic for an electronic system for enabling play of the gaming method described herein.
Figure 1C:
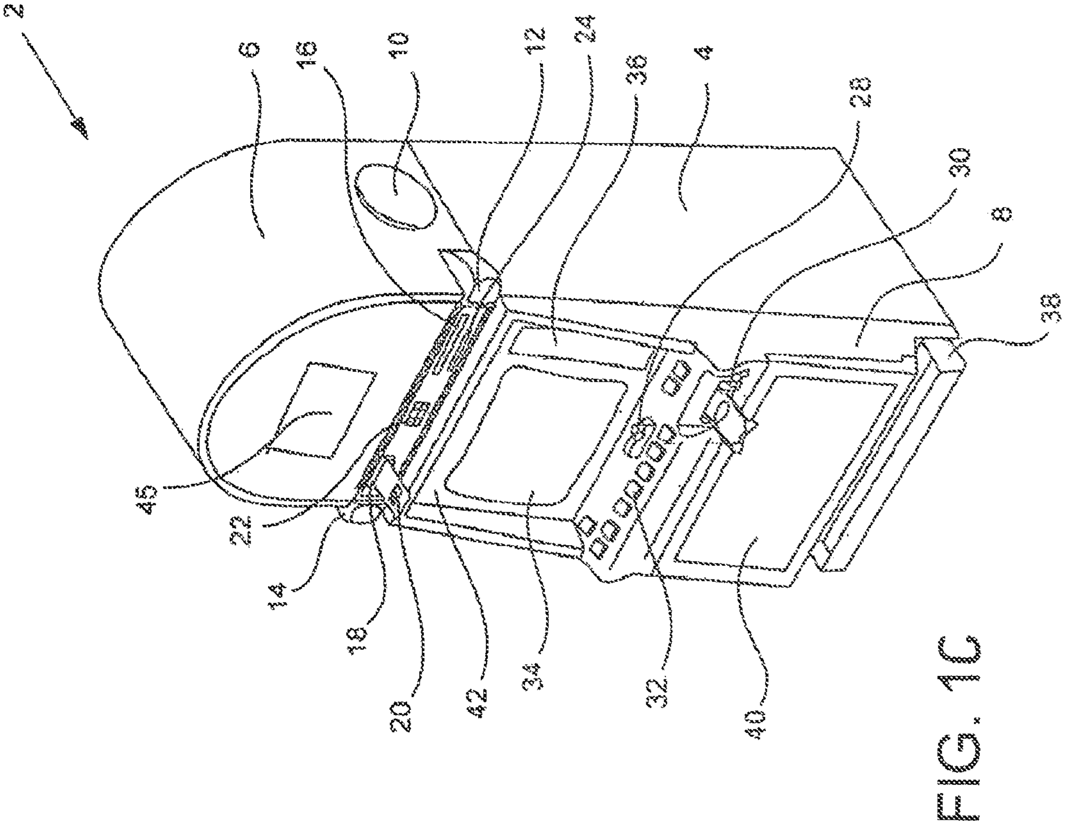
FIG. 1C shows an electronic gaming machine on which the gaming method may be executed.

Turning next to FIG. 1C, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a display area including a mechanical gaming system (or less preferably a separate electronic game) 40. There may be an overlay of touchscreen functionality on the separate electronic game 40 or some of the buttons 32 may be functional on the separate mechanical gaming system 40. That separate mechanical gaming system may be in a relatively vertical viewing position as shown, or in a more horizontal (table like) display unit. Viewable through the main door is a video display monitor 34 and an information panel 36. The display monitor 34 will typically be a cathode ray tube, high resolution flat-panel LCD, LED, plasma screen or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video blackjack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk-screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the n:iain cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display-mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult Further, techniques and methods for solving a problem in the PC industry, such as device compatibility and connectivity issues, might not be adequate in the gaming environment For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computer systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines typically have power supplies with tighter voltage margins than that required by the operating circuitry. In addition, the voltage monitoring circuitry implemented in gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion, where multiple peripheral devices are connected to a single serial channel. The serial interfaces may be used to transmit information using communication protocols that are unique to the gaming industry. For example, the Netplex™ system of IGT is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights within the separate mechanical (or electronic) separately, individually wagerable gaming system 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Another gaming network that may be used to implement some aspects of the invention is depicted in FIG. 1A. Gaming establishment 1001 could be any sort of gaming establishment, such as a casino, a card room, an airport, a store, etc. In this example, gaming network 1077 includes more than one gaming establishment, all of which are networked to game server 1022.

Here, gaming machine 1002, and the other gaming machines 1030, 1032, 1034, and 1036, include a main cabinet 1006 and a top box 1004. The main cabinet 1006 houses the main gaming elements and can also house peripheral systems, such as those that utilize dedicated gaming networks. The top box 1004 may also be used to house these peripheral systems.

The master gaming controller 1008 controls the game play on the gaming machine 1002 according to instructions and/or game data from game server 1022 or stored within gaming machine 1002 and receives or sends data to various input/output devices 1011 on the gaming machine 1002. In one embodiment, master gaming controller 1008 includes processor(s) and other apparatus of the gaming machines described above. The master gaming controller 1008 may also communicate with a display 1010.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1008 may also communicate with EFT system 1012, EZPay™ system, and player tracking system 1020. The systems of the gaming machine 1002 communicate the data onto the network 1022 via a communication board 1018.

It will be appreciated by those of skill in the art that embodiments of the present invention could be implemented on a network with more or fewer elements than are depicted in FIG. 1A. For example, player tracking system 1020 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1024 and translator 1025 are not required for all gaming establishments 1001. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1042 provides this function for gaming establishment 1001. Site controller 1042 is connected to a central system and/or other gaming establishments via one or more networks, which may be public or private networks. Among other things, site controller 1042 communicates with game server 1022 to obtain game data, such as ball drop data, bingo card data, etc.

In the present illustration, gaming machines 1002, 1030, 1032, 1034 and 1036 are connected to a dedicated gaming network 1022. In general, the DCU 1024 functions as an intermediary between the different gaming machines on the network 1022 and the site controller 1042. In general, the DCU 1024 receives data transmitted from the gaming machines and sends the data to the site controller 1042 over a transmission path 1026. In some instances, when the hardware interface used by the gaming machine is not compatible with site controller 1042, a translator 1025 may be used to convert serial data from the DCU 1024 to a format accepted by site controller 1042. The translator may provide this conversion service to a plurality of DCUs.

Further, in some dedicated gaming networks, the DCU 1024 can receive data transmitted from site controller 1042 for communication to the gaming machines on the gaming network. The received data may be, for example, communicated synchronously to the gaming machines on the gaming network.

Here, CVT 1052 provides cashless and cashout gaming services to the gaming machines in gaming establishment 1001. Broadly speaking, CVT 1052 authorizes and validates cashless gaming machine instruments (also referred to herein as "tickets" or "vouchers"), including but not limited to tickets for causing a gaming machine to display a game result and cash-out tickets. Moreover, CVT 1052 authorizes the exchange of a cashout ticket for cash. These processes will be described in detail below. In one example, when a player attempts to redeem a cash-out ticket for cash at cashout kiosk 1044, cash out kiosk 1044 reads validation data from the cashout ticket and transmits the validation data to CVT 1052 for validation. The tickets may be printed by gaming machines, by cashout kiosk 1044, by a stand-alone printer, by CVT 1052, etc. Some gaming establishments will not have a cashout kiosk 1044. Instead, a cashout ticket could be redeemed for cash by a cashier (e.g. of a convenience store), by a gaming machine or by a specially configured CVT.

FIG. 1B illustrates an example of a network device that may be configured for implementing some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention also relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 1B illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 1B) or switch fabric based (such as a cross-bar).

The method can be implemented by all playing card symbols being provided by physical playing cards randomly provided to each respective player position, as where each physical playing cards is provided from a randomized set of at least one fifty-two card deck of physical playing cards, as from a dealer shoe, or shuffling machine tray. Electromechanical shuffling machines such as those produced by Shufflemaster, Inc, Division of Bally Industries within Scientific Games Incorporated are well suited for this method of providing physical playing cards, as are the mechanical dealing trays, passive dealing trays, and preshuffled dealing trays as known in the art. The games may also be played person-versus-person on networked or linked personal data entry devices such as smart phones, tablets, laptops, and other smart player-user electronic devices with visual displays and player input controls and interconnectivity through a gaming processor to monitor game play, as with an internet provider or central gaming server/processor. If there is an identical winning point count total in multiple ones of the at least two player positions, a player position which utilizes a most number of playing cards in attaining that winning point count total wins. Similarly, ties are broken to determine a winning hand by identifying a player using the playing cards in by selected means of points, numbers of cards, highest card in a hand or other means.

The gaming event may be played on electronic gaming tables, or mixed technology gaming tables. Such technology as disclosed in U.S. Pat. No. 9,721,421 (Blazevic); U.S. Pat. No. 7,264,243 (Yoseloff); U.S. Pat. No. 7,556,561 (White); U.S. Pat. No. 7,699,695 (White); U.S. Pat. No. 7,794,324 (White); U.S. patent applications Ser. Nos. 10/864,051; 10/764,995; 10/764,827; and 10/764,994 (Smith et al.). These references are incorporated by reference in their entirety, enabling use of the present gaming technology on electronically implemented gaming tables in which there are respective player positions, individual player input controls, individual player terminals with video displays, a central gaming processor and random number generator that provides random displays of randomly provided playing cards at player (and where needed, dealer) positions, determines wagers and community pots, can withdraw house commissions, and determine winning outcomes and distribute and withdraw value. As noted, the art enables both partially electronic tables, as where physical playing cards are used with a dealer distributing them, but with wagers being made electronically as with the DEQ Platinum Plus™ betting system or its equivalent, player terminals having crediting, accounting and wagering functions thereon (as with TITO systems, currency validators, eWallet responsive systems, and the like.

Figure 2:
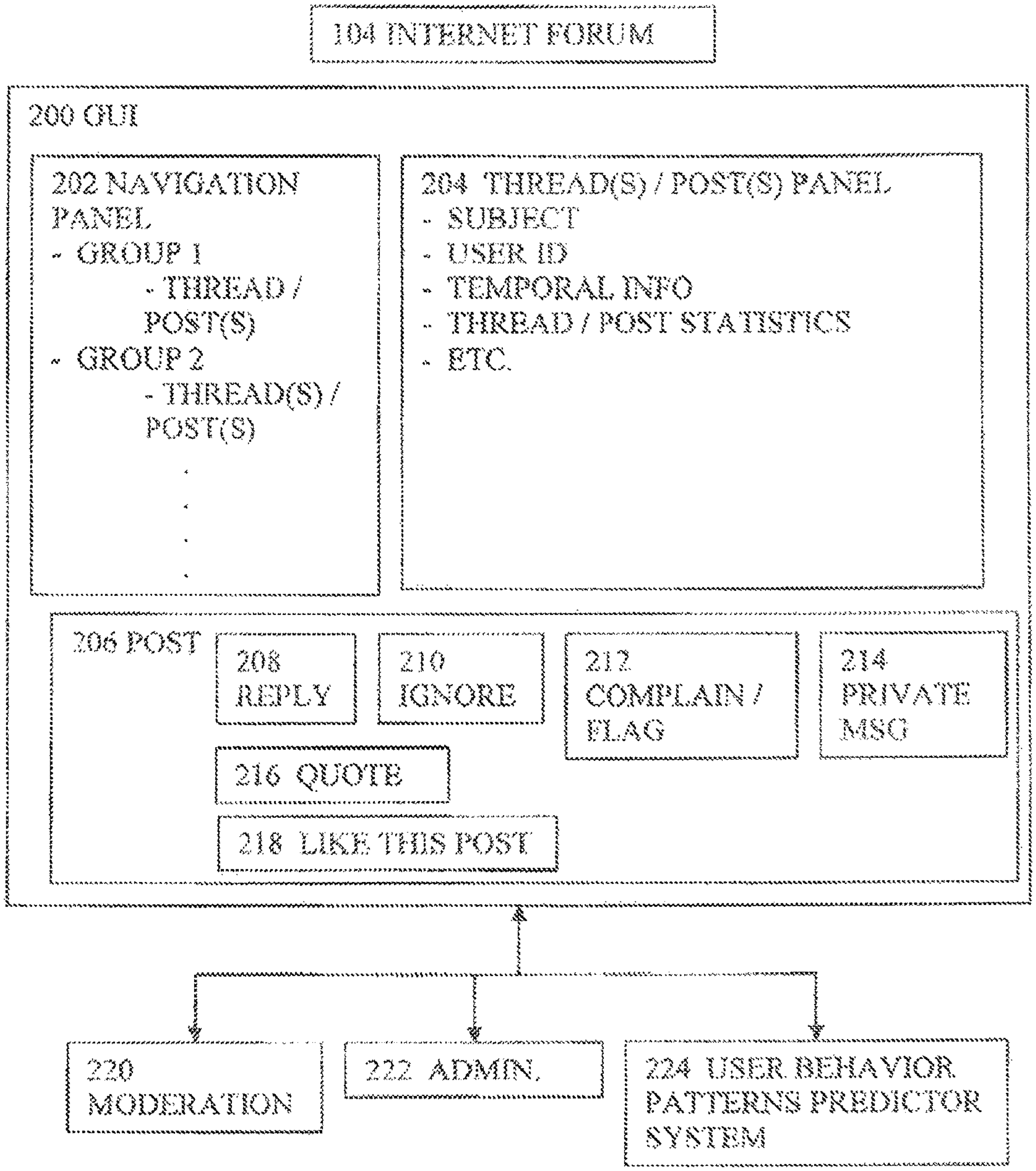
FIG. 2 illustrates a schematic implementation of an Internet forum or gaming community by using the system for analyzing game content and wagering events of Internet forum participants.
Figure 3:
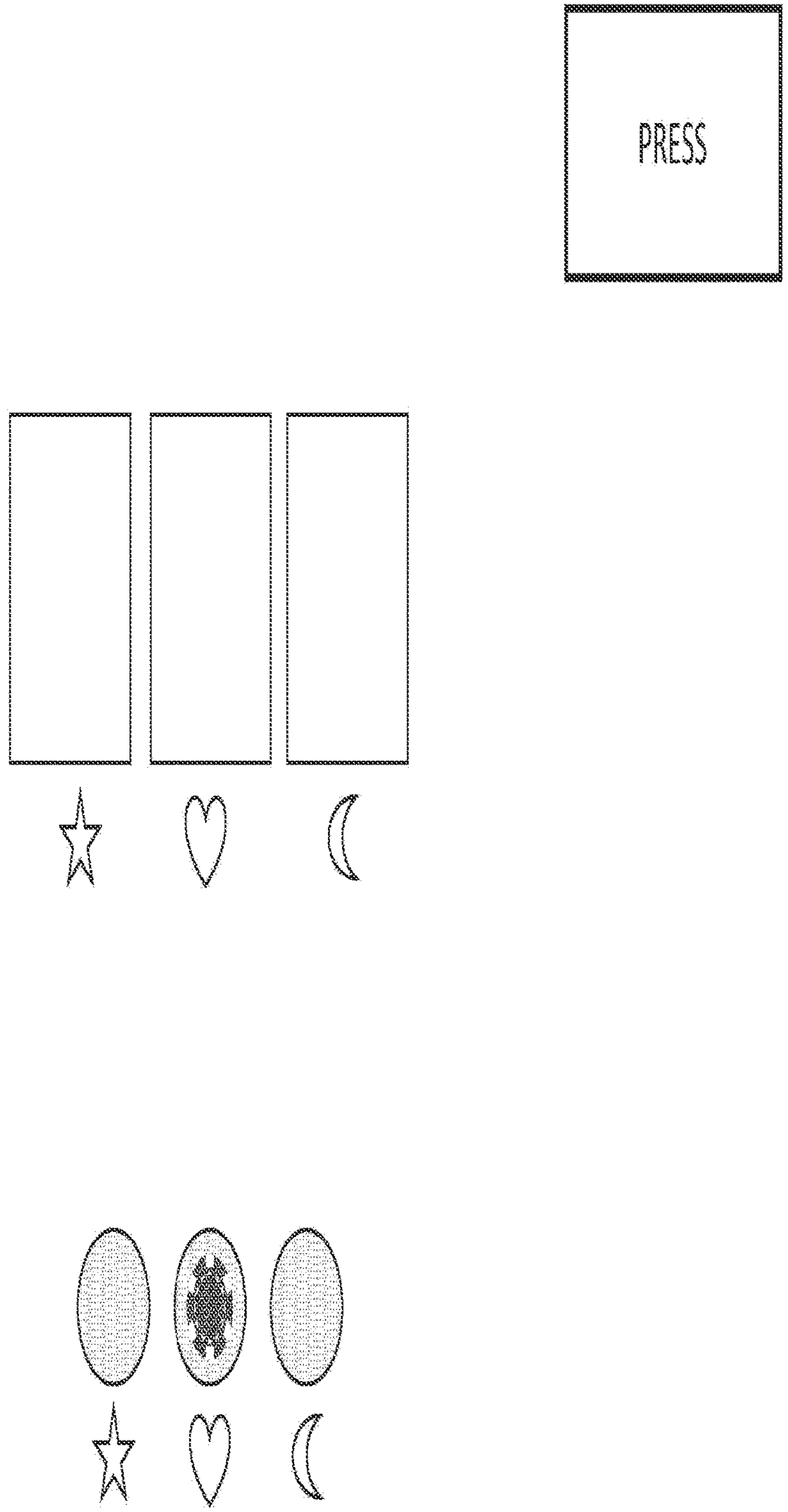
FIG. 3 shows an illustration of game play wherein a player selects the card that they think will have the highest rank of the three.

Referring to FIG. 2, which illustrates a schematic implementation of an Internet forum 104 by using the system for analyzing game content and wagering events of Internet forum participants, the Internet forum 104 may be presented to the users or participants by using a graphical user interface (GUI) 200. The GUI may include a navigation panel 202 to allow the users to quickly navigate to a desired post, thread, and/or group within the Internet forum. The Internet forum 104 may further comprise a thread and/or post panel 204 that shows more detailed information of a group, a thread of posts, or a particular post. Such information may comprise, for example but not limited to, the subject, user identifications, temporal information, or some statistics of particular thread(s), post(s), or discussion(s). It shall be noted that the terms user and participants may be used interchangeably throughout the description of various embodiments and thus should be interpreted as such.

The Internet forum 104 may further comprise quick comment tools for a particular post (which may include a partial outcome, a partial event, an intermediate outcome or event, a side bet event, a final outcome or result 206. These quick communication tools may comprise, for example but not limited to, 208 "reply to the post", 210 "ignore the post", 212 "complain about/flat the post" 214, "send private message to poster", 216 "quote this particular post", 218 "like this post", etc. The Internet forum is supported on the back end which comprises the local events or group events, or individual joiner events, or team events 220 which moderates and regulates the gaming events on the Internet forum, the administrator(s) 222 who resolves the technical issues and wager payouts of the Internet forum, and the player activity or user behavior pattern predictor system 224.

In a system according to the present invention for real time attendance, from a remote game site, at a game going on at relocated game site, comprises means for the audio and video reproduction of recordings of the relocated game site, at said remote game site, and means for virtually repeating, in said remote game site, a game surface existing in said relocated game site. Furthermore, the system comprises one or more interface devices apt to allow an interaction between a gamer and said game surface 10 existing in said relocated game site. In order to make clear the modes therewith one wants to promote the real time remote game, the complete cycle which is performed by the gamer in this context is described hereinafter.

The cycle starts when a gamer enters the room of the remote site and, after acquiring the information reported inside the room and after viewing the live game session, coming from the relocated site 3, projected on one or more monitors/tv sets 204*a* of the room itself, wishes to attend the game. To this purpose the system provides the use of one or more interface devices such as the cameras shown which, by way of example, may comprise at least a programmable electronic device of wireless type, for example a smartphone, or a tablet, or the like. Each programmable electronic device comprises a display, and it is configured for reproducing on said display information related to the game surface 10 existing in the relocated game site.

Furthermore, advantageously, the programmable electronic device is programmed so as to allow the gamer to attend the game from said remote site. For example, by exploiting current smartphones (or tablets or the like), the gamer is allowed, following registration on a web platform, to download an Application for accessing the game on his/her own smartphone or tablet (hereinafter such Application will be referred to with the short-term App). At this point, the gamer may load the funds he/she wishes on his/her own game account and he/she is ready to attend the available games.

As previously mentioned, the means 204*a* for the audio and video reproduction comprises one or more cameras arranged at the relocated game site and/or one or more monitors/tv sets arranged at the remote game site. In this way, in order to improve the game experience of the gamer, the live broadcast of the game session really performed by a croupier operating at the relocated side, is made available on a big monitor/tv set, which the gamer may attend through his/her own game App available on his/her own mobile device (smartphone or tablet or the like). For example, in case of the roulette game, the gamer has available on his/her own mobile device an App reproducing chips and game table, therethrough he/she may perform bets by touching the table area of interest.

In one embodiment, a cash station 100 (not shown), may be handled by an operator of a game site 2, usable for example by the gamers for the preliminary procedures of loading funds onto their own game account.

The cash station 100 provides a personal computer 101, thereto a scanner 102 and a printer 103 are advantageously connected for the administrative type requirements (registration of gamers, scanning of identity documents, etc.). The cash station 100 could further be equipped with a router 104 (preferably of wireless type) for accessing a local network. Furthermore, in order to improve the game experience of the gamer and to promote the socialization with other people present in the room, inside the same there are means for virtually repeating the game surface 10.

Figure 4:
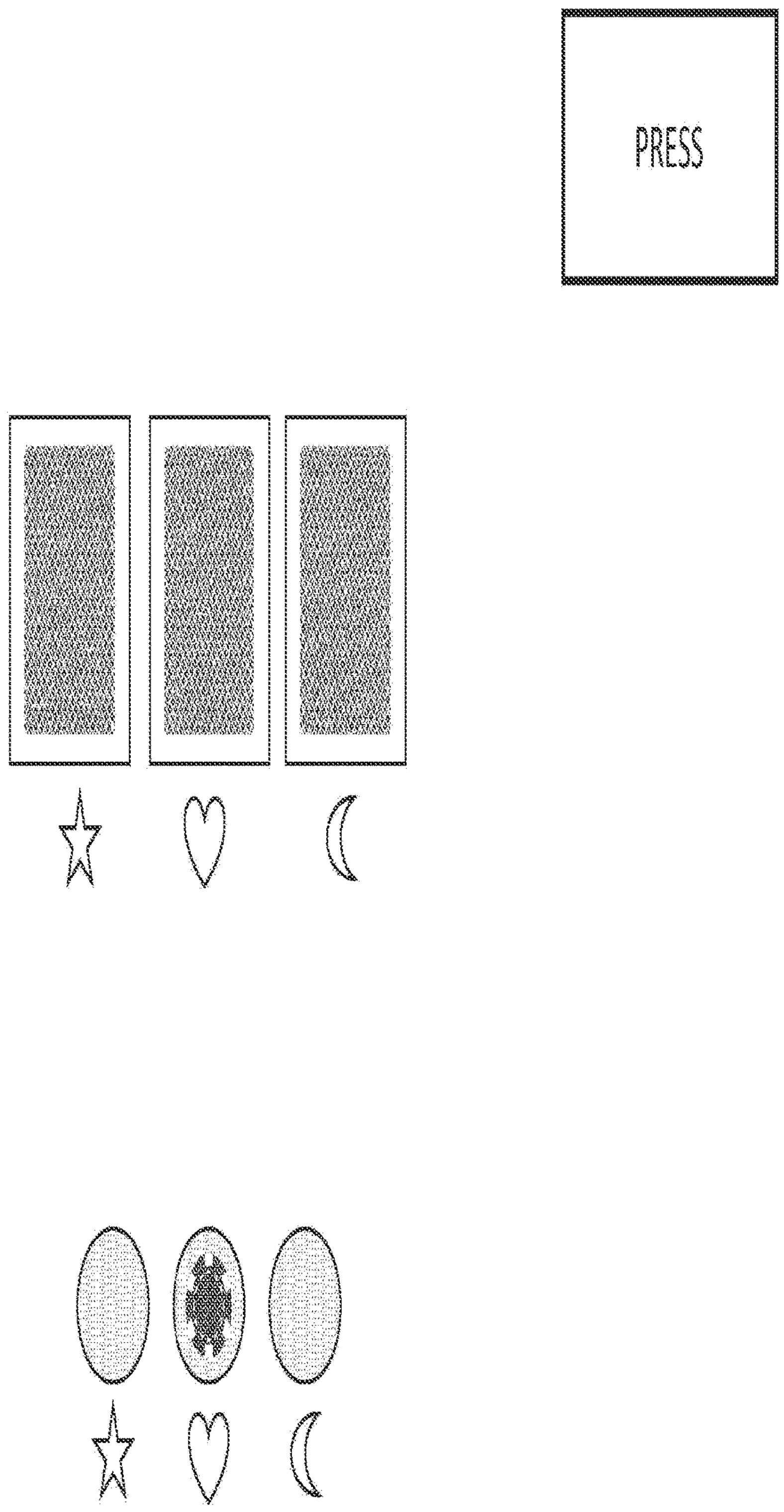
FIG. 4 shows an illustration of game play wherein after three cards are dealt face down.
Figure 4A:
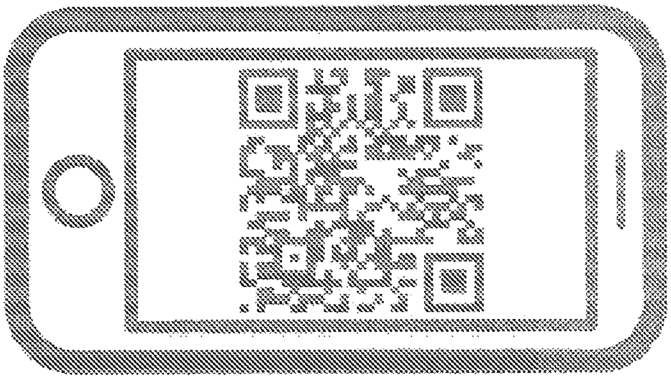
FIG. 4A shows a room code of the QR-Code type, identifying the game table, according to one embodiment.

The game table 5 is equipped with apparatuses for implementing the function thereof of repeating the game surface 10. In particular, the game table 5 comprises a horizontal, preferably high-definition monitor, whereon an image is reproduced, updated in real time, of the game surface 10, existing in the relocated game site 3, and a QR-Code of the room identifying the table, shown by way of example in FIG. 4A. Thanks to the help of such means, each bet performed by the gamer through his/her own App is repeated even onto the horizontal monitor, which reproduces the game layout of the baccarat table. Said horizontal monitor has no interactive feature, but it reproduces exclusively what made individually by each gamer on his/her own mobile device. Furthermore, the game table 508 (from FIG. 5A) in turn comprises apparatuses 200 to be connected, preferably in wireless mode, to the local network and, by means of internet, to the relocated game site. To this purpose, a processor 216*a* may be provided, thereto an access point 201*a*, for the connection to Internet, and a router 202*a*, for the connection to the local network, are connected, for example by means of a switch 203*a*.

Figure 5:
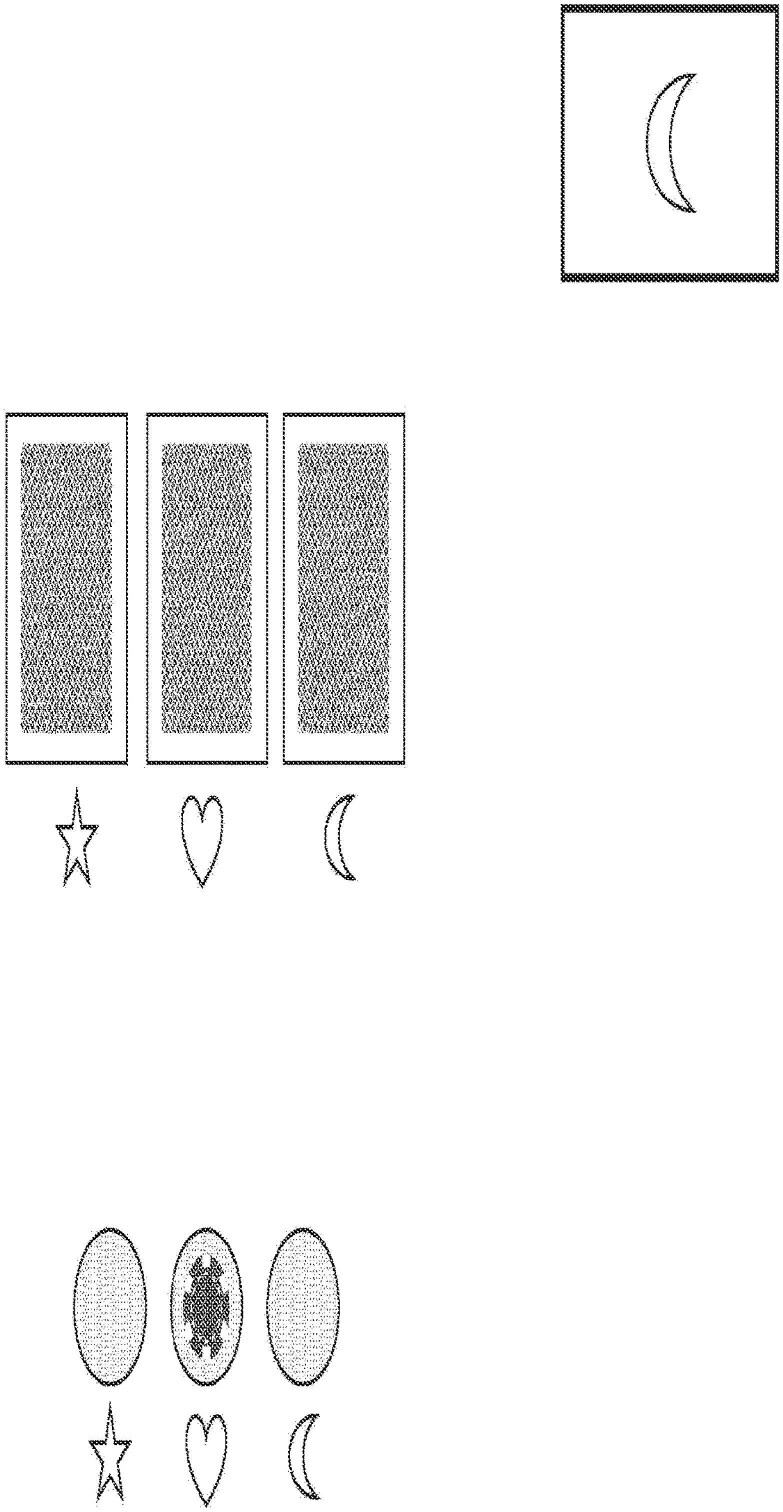
FIG. 5 shows an illustration of game play wherein after three cards have been dealt, a symbol is randomly generated.
Figure 5A:
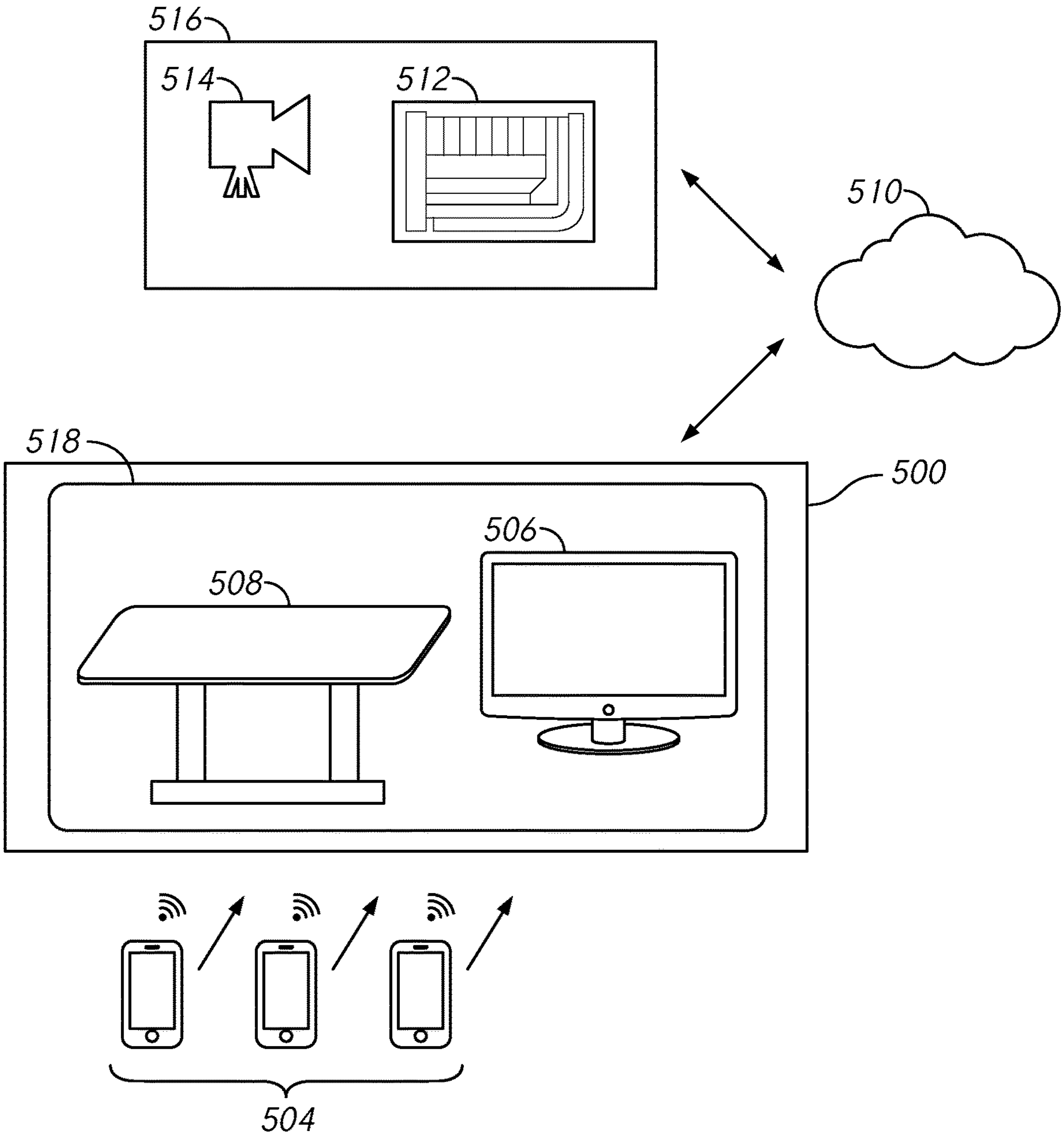
FIG. 5A shows an embodiment of the invention using cloud storage.

FIG. 5A continues showing a game site 516 with the game table 512 recorded by camera 514. Recordings of the table from the camera 514 are transmitted through the cloud 510 to a second distal site 500 with a table 508 and display screen 506, shown in a second display screen 518. Communication of wagers are transmitted to the second site 500, which may be a virtual room 518, by player devices such as smart phones 504.

Furthermore, an additional monitor 300, arranged in the room of the remote game site 2, may be connected to the processor 203*a*, in case by means of an additional personal computer 209*a* (which may be a cash PC), for enjoying a live broadcast by the gamers and/or other present people. Other multimedia devices, such as for example loudspeaker baffles (not shown), may be connected to the monitor.

Advantageously, by means of the cash PC 209*a*, positioned in the cash station, the operator is capable to handle the devices constituting the system. For example, he/she could turn off and/or re-start the table, turn-off or re-start the PC for the live broadcast, change the camera for displaying the live broadcast from the casino.

Figure 6:
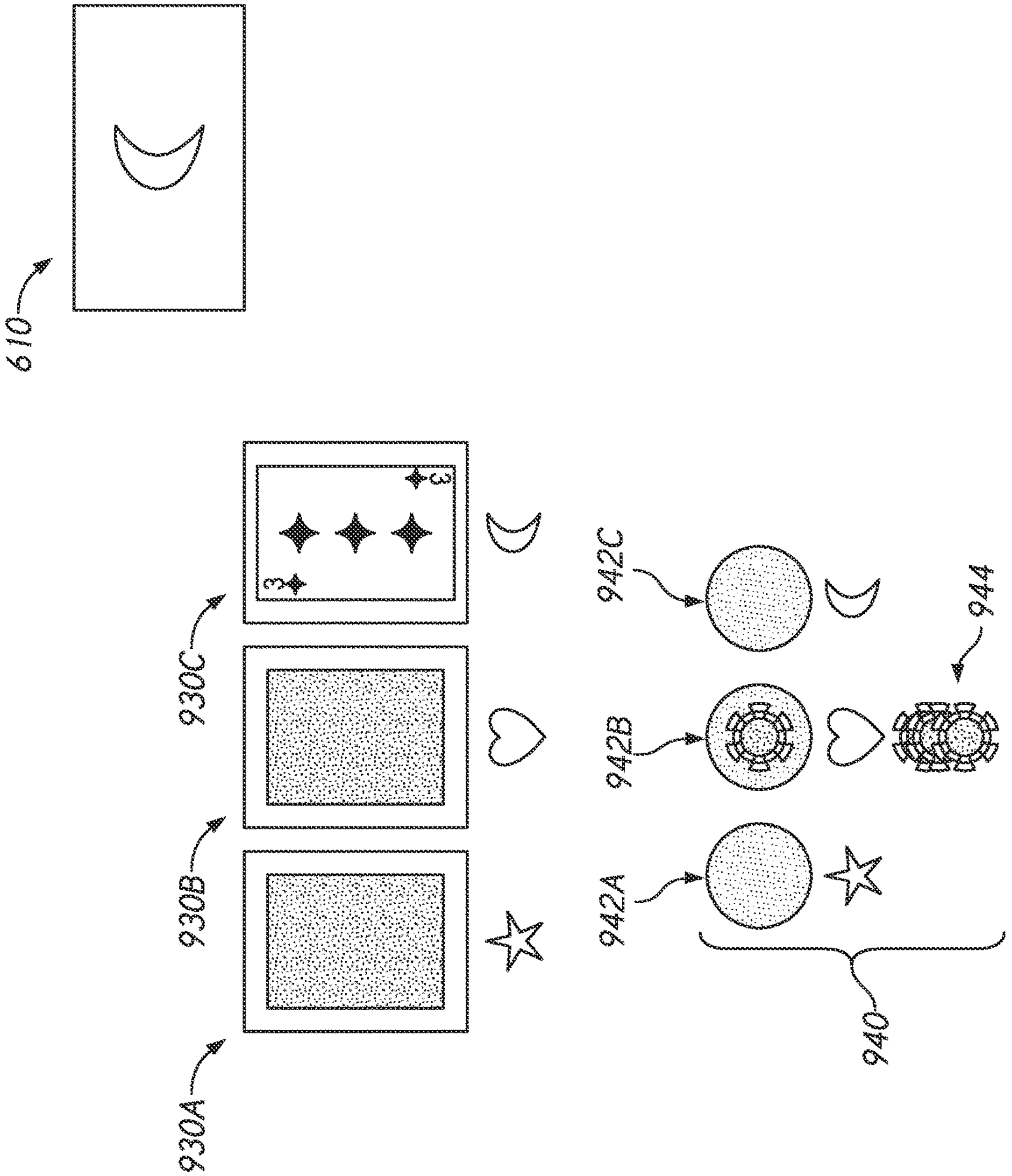
FIG. 6 shows an illustration of game play wherein after one of the three symbols has been selected, the selected card is revealed and the player has the option to raise their initial bet but up to 3 times.
Figure 9:
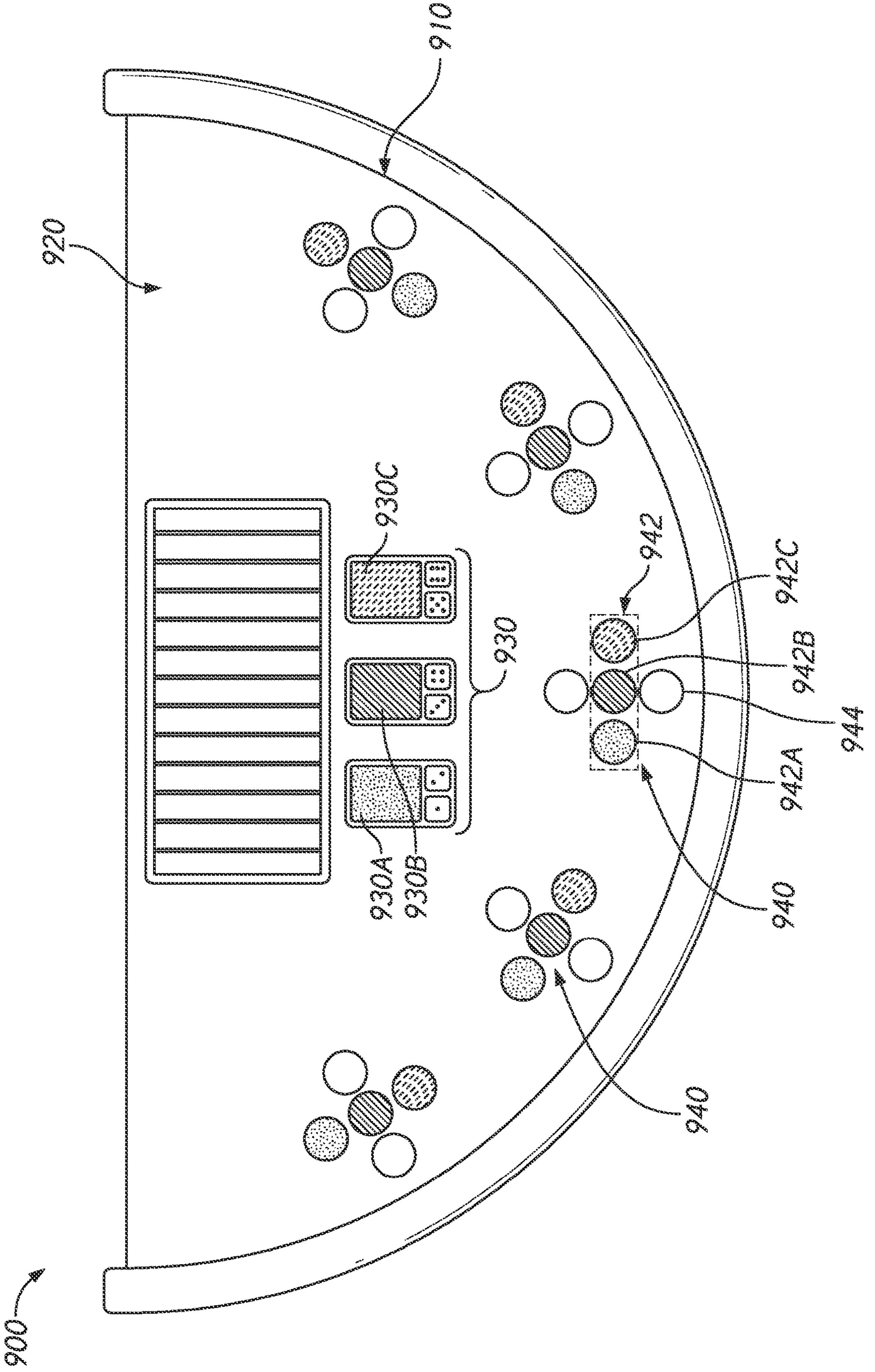
FIG. 9 is a top view of a gaming table according to one or more embodiments.

FIG. 9 shows a gaming table according to one or more embodiments. The gaming table of FIG. 9 includes a gaming table 910, a surface 920, three card-placement areas 930, and a plurality of user-playing areas 940. Each of the user-playing areas 940 includes three card-placement indicators 942 and a wagering indicator 944. The card-placement area 930 may be configured to position one or more playing cards, either face up or face down. Each of the card-placement areas 930 may be associated with a symbol unique to that card-placement area 930. For example, the first card-placement area 930A is associated with the faces of a die showing one and two; the second card-placement area 930B is associated with the faces of a die showing three and four; and the third card-placement area 930C is associated with the faces of a die showing five and six. It should be noted that any other suitable type of symbols capable of being uniquely associated with each of the card-placement areas 930 may be utilized as recognized by a person having ordinary skill in the art. In some embodiments, non-numeric symbols may be used instead of numeric symbols. For example, as shown in FIG. 6, shapes may be used as symbols. In this embodiment, a star-shape symbol is associated with the first card-placement area 930A; a heart-shape symbol is associated with the second card-placement area 930B; and a crescent symbol is associated with the third card-placement area 930C.

Still referring to FIG. 9, each card-placement indicator 942 may be configured to associate with one of the card-placement areas 930. For example, the first card-placement indicator 942A (e.g., red) may be configured to associate with the first card-placement area 930A (e.g., red); and the second card-placement indicator 942B (e.g., white) may be configured to associate with the second card-placement area 930B (e.g., white); and the third card-placement indicator 942C (e.g., blue) may be configured to associate with the third card-placement area 930C (e.g., blue). In this embodiment, the gaming table 910 includes five user-playing areas 940; however, any suitable number of user-playing areas 940 may be included as recognized by a person having ordinary skill in the art. The user-playing are 940 includes three card-placement indicators 942 and a wagering indicator 944. The number of the card-placement indicators 942 corresponds to the number of the card-placement areas 930. In some embodiments, the number of the card-placement areas 930 and the card-placement indicators 942 may be any other number that is suitable to play the game illustrated in this application as recognized by a person having ordinary skill in the art.

Still referring to FIG. 9, the wagering indicator 944 may be configured to associate a credit value (e.g., money) with at least one of the card-placement areas 930. In an embodiment, the wagering indicator 944 may be configured to allow the user to physically interact with the wagering indicator 944. For example, the user may be allowed to place one or more chips on or in proximity to the wagering indicator 944 to indicate that the user is wagering a certain amount of money represented by the amount of chips placed on or in proximity to the wagering indicator 944.

In operation, the gaming table 910 of FIG. 9 may be played in the following manner. An operator/dealer of the game may position at least one card on each of the card-placement areas 930 face-down. One or more users may be provided with an option to select one of the three card-placement areas 930 by physically interacting with the card-placement indicators 942. For example, as shown in FIG. 6, the user may select one of the three card-placement areas 930 by placing a chip on or in proximity to one of the card-placement indicators 942 that corresponds to the card-placement area 930 the user wishes to select. In this embodiment, the user may be allowed to place a chip on the card-placement indicator 942B, which is associated with the heart symbol, and thus, the card-placement indicator 942B associated with the heart symbol may be selected by the user. In some embodiments, the user may be allowed to place a chip on the card-placement indicator 942A (red) of FIG. 9 to indicate that the user wishes to select the first card-placement area 930A (red) that is associated with the card-placement indicator 942A by color.

Next, the user may be provided with an option to provide a credit value associated with the selected card-placement area 930 by physically interacting with the wagering indicator 944. For example, as shown in FIG. 6, the user may be allowed to place one or more chips on or in proximity to the wagering indicator 944. It should be noted that a chip may be configured to represent any suitable amount of money/value that may be utilized in connection with the game table according to one or more embodiments of the present disclosure. In some embodiments, any items or mechanisms other than chips suitable for wagering may be used to allow the user to physically interact with the wagering indicator 944 to select at least one card-placement area and/or to provide a credit value associated with the selected card-placement area 930.

Figure 7:
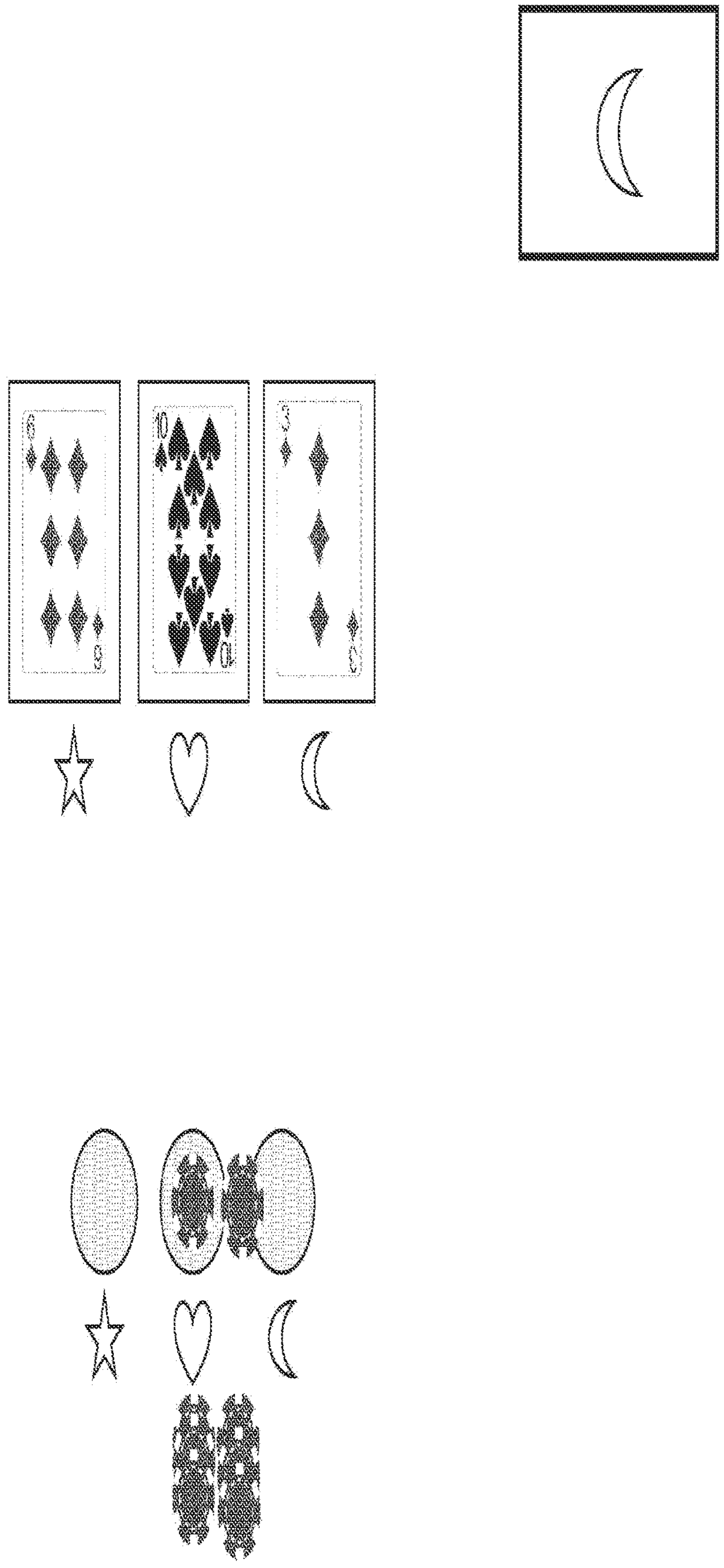
FIG. 7 shows an illustration of game play wherein after execution of play from FIG. 6, the remaining cards are revealed. If the player's card is revealed to have the highest rank, the player's initial wager and optional raise are paid 1:1.
Figure 8:
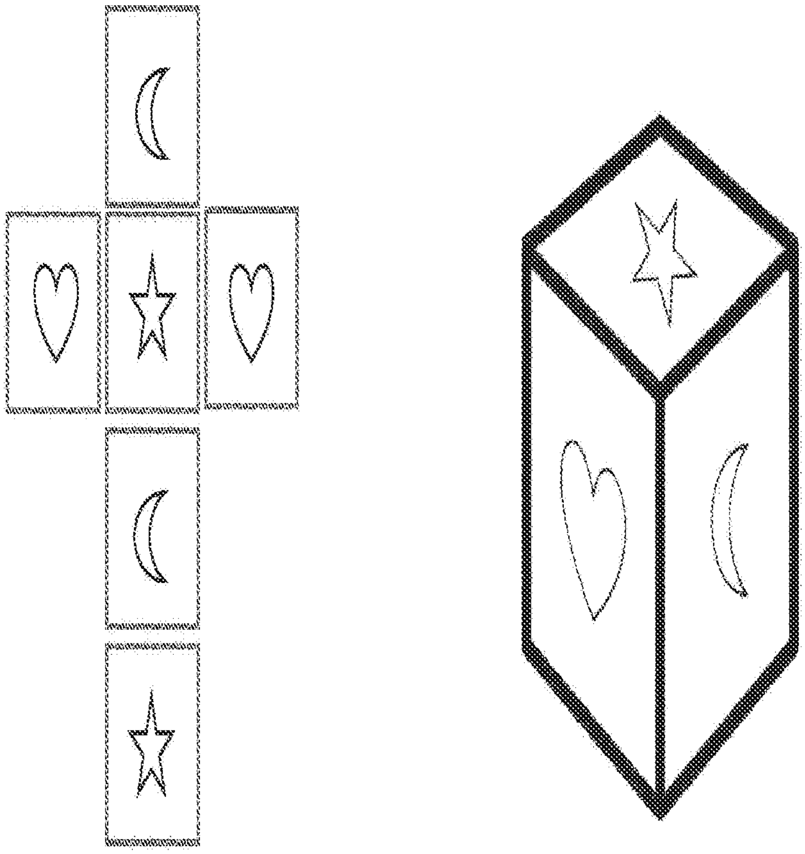
FIG. 8 shows an embodiment of a symbol generation apparatus.

Next, a symbol is randomly generated by using a symbol generation apparatus. The symbol generation apparatus may be a die having at least three different individual symbols on three faces of the die, as shown in FIG. 8. In another embodiment, the symbol generation apparatus may be a spinning wheel having spaces with at least three random symbols displayed on the spinning wheel and a pointer. In another embodiment, the symbol generation apparatus may be an electronic random symbol generator comprising an electrically powered display element (e.g., 610 of FIG. 6) and a random number generator. The randomly generated symbol may be associated with one of the card-placement areas 930. The operator/dealer may turn over (e.g., face up) the card placed on the card-placement area 930 associated with the randomly generated symbol. The rank of that card is thereby exposed and displayed to the user. Next, the user may be provided with an option to keep the credit value the same or increase the credit value by physically interfacing with the wagering indicator 944. For example, as shown in FIG. 6, the user may increase the credit value by three (3) times by placing three chips on the wagering indicator 944. It should be noted that the credit value may be increased by two (2) times or any other amount instead of three (3) times, as recognized by a person having ordinary skill in the art. The operator/dealer may turn over (e.g., face up) the two remaining cards placed on the other two card-placement areas 930 such that the ranks associated with these two remaining cards are exposed and displayed to the user. For example, as shown in FIG. 6, the operator/dealer may turn over (e.g., face up) the cards placed on the card-placement areas 930A and 930B (see FIG. 7). If the rank of the card associated with the randomly generated symbol is higher than the ranks of the two other cards, then the user is provided with an award. The amount of the award may be determined based on the amount the user betted by interacting with the wagering indicator 944. For example, if the user betted three chips, as shown in FIG. 6, the user may be awarded three times the amount of money the user initially betted by interacting with the wagering indicator 944.

Figure 10:
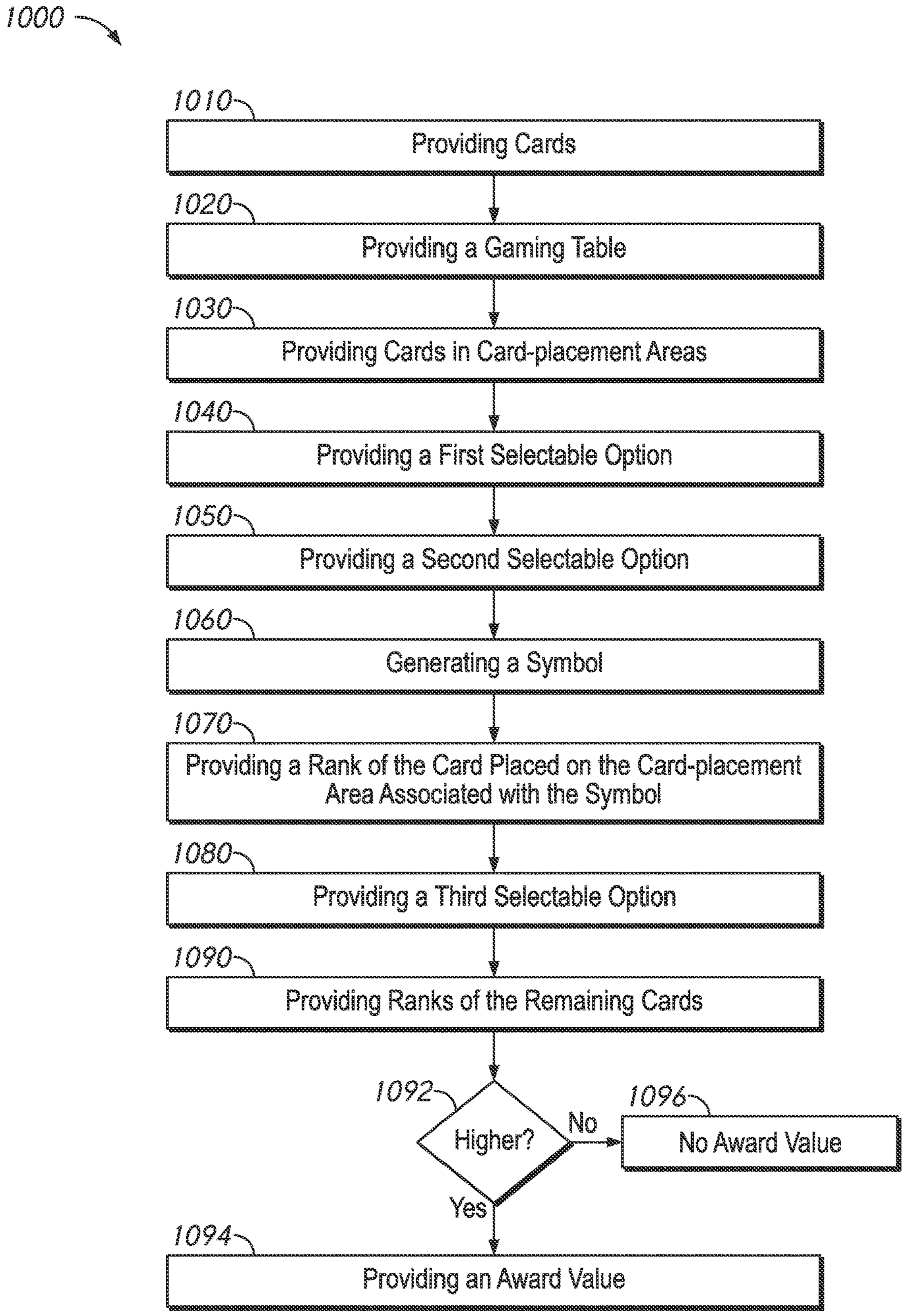
FIG. 10 is a flow diagram of a method for providing a game according to one or more embodiments.

FIG. 10 is a flow diagram of a method for playing a gaming table according to one or more embodiments. However, the present disclosure is not limited to the sequence or number of the operations of the method 1000 shown in FIG. 10, and can be altered into any desired sequence or number of operations as recognized by a person having ordinary skill in the art. For example, in some embodiments, the order may vary, some processes thereof may be performed concurrently or sequentially, or the method 1000 may include fewer or additional operations.

Referring to FIG. 10, the method 1000 may be started by providing a deck of cards at block 1010. Each card in the deck has a rank. The gaming table 910 may be provided at block 1020. The gaming table includes a surface. As described above with respect to FIG. 9, the surface of the gaming table 910 comprises three card-placement areas 930 for positioning the cards and a plurality of user-playing areas 940. The user-playing areas comprises three card-placement indicators 942 and the wagering indicator 944. Each of the card-placement indicators 942 is uniquely associated with one of the card-placement areas 930. Next, at block 1030, at least one of the cards may be provided in each of the card-placement areas 930 face down. Next, at block 1040, the user may be provided with a first selectable option, which may allow the user to select one of the three card-placement areas 930 by physically interacting with the card-placement indicators 942, as described above with respect to FIG. 9. Next, at block 1050, the user may be provided with a second selectable option, which may allow the user to provide a credit value associated with the selected card-placement area 930 by physically interacting with the wagering indicator 943, as described above with respect to FIG. 9. Next, at block 1060, a symbol may be randomly generated by using a symbol generation apparatus. The symbol generation apparatus may be configured to randomly generate the symbol that is associated with one of the card-placement areas 930. Next, at block 1070, a rank of the card placed on the card-placement area 930 associated with the randomly generated symbol may be provided. At block 1080, a third selectable option may be provided to the user. The user may be allowed to either keep the credit value the same or increase the credit value by physically interfacing with the wagering indicator 944, as described above with respect to FIG. 9. At block 1090, a rank of each of the two remaining cards may be provided. At block 1092, the rank of the card associated with the symbol may be compared with the ranks of the two other cards. At block 1094, if the rank of the card associated with the symbol is higher than the ranks of the two other cards, then the user may be provided with an award value. The amount of the award value may be determined in the same manner as described above with respect to FIG. 9. At block 1096, if the rank of the card associated with the symbol is not higher than the ranks of the two other cards, then no award value may be provided to the user.

Referring to FIG. 5, an illustrative system for implementing a mobile app wagering event of the present technology may include a device 240*a* having a processor 216*a* with a memory, one or more input peripherals 514, and one or more output peripherals 212*a*. System 240*a* may also include a network connection 204, and one or more remote computers 209*a*.

An illustrative device 504 is a smartphone or a tablet computer, although any other consumer electronic device can be used. The processor can comprise a microprocessor such as an Atom or A4 device. The processor's operation is controlled, in part, by information stored in the memory, such as operating system software, application software (e.g., "apps"), data, etc. The memory may comprise flash memory, a hard drive, etc.

The input peripherals 514 may include a camera, buttons, contact switch, pressure switch and/or a microphone. The peripherals (or device 512 itself) may also comprise an interface system by which analog signals sampled by the camera/microphone are converted into digital data suitable for processing by the system. Other input peripherals can include a touch screen, keyboard, etc. The output peripherals 512 212*a* can include a display screen, speaker, etc. The network connection to the cloud 510 can be wired (e.g., Ethernet, etc.), wireless (WiFi, 4G, Bluetooth, etc.), or both.

In an exemplary operation, device 216*a* receives a set of digital content data, such as through a wireless interface, through the network connection to the cloud 510, or otherwise. The content data may be of any type, but video content is required at a minimum, and audio is exemplary of additional content.

The system 240*a* preferably processes the digital content data to generate corresponding identification data. This may be done, e.g., by applying a password, digital watermark decoding process, or a fingerprinting algorithm—desirably to data representing the sonic or visual information itself, rather than to so-called "out-of-band" data (e.g., file names, header data, etc.). The resulting identification data serves to distinguish the received content data from other data of the same type (e.g., other audio or other video).

By reference to this identification data, the system determines corresponding software that should be invoked and even open access to an online account that can be accessed by the player/user on the device. One way to do this is by indexing a table, database, or other data structure with the identification data, to thereby obtain information identifying the appropriate software.

In some instances, the data structure may return identification of a single software program. In that case, this software is launched—if available. (Availability does not require that the software be resident on the device. Cloud-based apps may be available.) If not available, the software may be downloaded (e.g., from an online repository, such as the iTunes store or an online wagering company), installed, and launched. (Or, the device can subscribe to a software-as-service cloud version of the app.) Involvement of the user in such action(s) can depend on the particular implementation: sometimes the user is asked for permission; in other implementations such actions proceed without disturbing the user.

Sometimes the data structure may identify several different software programs. The different programs may be specific to different platforms, in which case, device 12 may simply pick the program corresponding to that platform (e.g., Android G2, iPhone 4, etc.). Or, the data structure may identify several alternative wagering programs that can be used on a given platform. In this circumstance, the device may check to determine which—if any—is already installed and available. If such a program is found, it can be launched. If two such programs are found, the device may choose between them using an algorithm (e.g., most-recently-used; smallest memory footprint; etc.), or the device may prompt the user for a selection. If none of the alternative programs is available to the device, the device can select and download one—again using an algorithm, or based on input from the user. Once downloaded and installed, the application is launched.

Sometimes the data structure may identify different programs that serve different functions—all related to the content. One, for example, may be an app for discovery of hints or suggestions for moves within the game. Another may be an app for purchase of the content (e.g., pay for a hint, especially if the display provides a signal that a "better move" is available. Again, each different class of software may include several alternatives.

Note that the device may already have an installed application that is technically suited to work with the received content (e.g., to render an active video file, operate a preapproved or licensed gaming content, MPEG4 or an MP3 file). For certain types of operations, there may be dozens or more such programs that are technically suitable. However, the content may indicate that only a subset of this universe of possible software programs should be used.

Software in the device 240*a* may strictly enforce the content-identified software selection. Alternatively, the system may treat such software identification as a preference that the user can override. In some implementations the user may be offered an incentive to use the content-identified software. Or, conversely, the user may be assessed a fee, or other impediment, in order to use software other than that indicated by the content.

Sometimes the system may decline to render certain content on a device (e.g., because of lack of suitable app or hardware capability), but may invite the user to transfer the content to another user device that has the needed capability, and may implement such transfer.

Instead of absolutely declining to render the content, the system may render it in a limited fashion. For example, a video might be rendered as a series of still key frames (e.g., from scene transitions). Again, the system can transfer the content where it can be more properly enjoyed, or—if hardware considerations permit (e.g., screen display resolution is adequate)—needed software can be downloaded and used.

As shown in FIG. 5A (which data structure may be resident in the memory of processor 216*a*, or in a remote computer system 209*a*), the indication of software may be based on one or more contextual factors—in addition to the content identification data. (Only two context factors are shown; more or less can of course be used.)

One formal definition of "context" is "any information that can be used to characterize the situation of an entity (a person, place or object that is considered relevant to the interaction between a user and an application, including the user and applications themselves." Another is the allowable or active state of the gaming event, as either a social event or a legal on-line wagering event.

Context information can be of many sorts, including computing context (network connectivity, memory availability, processor type, CPU contention, etc.), user context (user profile, location, actions, preferences, nearby friends, social network(s) and situation, etc.), physical context (e.g., lighting, noise level, traffic, etc.), temporal context (time of day, day, month, season, etc.), history of the above, etc.

In the technology, information data rows may correspond to the same content (i.e., same content ID), but they indicate different software should be used—depending on whether the user's context is indoors or outdoors. (The software is indicated by a symbol hex identifier; the content is identified by multiple hex symbols. Identifiers of other forms, and longer or shorter in length, can of course be used.) Row 36 shows a software selection that includes two items of software—both of which are invoked. (One includes a further descriptor—an identifier of a gaming event video that is to be loaded by software "FF245.") This software is indicated for a user in a daytime context, and for a user in the 20-25 age demographic.

Information displayed may include user location (zip code) and gender as contextual data. The software for this content/context is specified in the alternative (i.e., four identifiers "OR"d together, as contrasted with the "AND" in other rows). The same content ID can correspond to different codecs—depending on the device processor (Atom or A4).

(By point of comparison, consider the procedure by which codecs are presently chosen in an exemplary-only manner. Typically, the user isn't familiar with technical distinctions between competing codecs, and the artist has no say. Codec selection is thus made by neither party that is most vitally interested in the choice. Instead, default codecs come bundled with certain media rendering software (e.g., Windows Media Player). If the defaults are unable to handle certain content, the rendering software typically downloads a further codec—again with no input from the parties most concerned.)

It will be understood that the software indicated by the content can be a stand-alone app, or a software component—such as a codec, driver, etc. The software can render the content, or it can be a content companion—providing other information or functionality related to the content. In some implementations the "software" can comprise a URL, or other data/parameter that is provided to another software program or online service (e.g., a YouTube video identifier).

All such software identified in the table may be chosen by the proprietor (e.g., game designer, layout artist, content creator or copyright-holder) of the content with which it is associated. This affords the proprietor a measure of artistic control that is missing in most other digital content systems. (The proprietor's control in such matters should be given more deference than, say, that of a content distributor—such as Double Deal™ internet gaming, AOL or iTunes. Likewise, the proprietor's choice seems to merit more weight than that of the company providing word processing and spreadsheet software for the device.)

The popularity of content can lead associated software to become similarly popular, which is why the ambience of the present game may channel a feel like that of the popular baccarat games. This can induce other content proprietors to consider such software for use with their own content, since wide deployment of that software may facilitate consumer exposure to the other proprietor's content.

(The software may be changed over time, such as through the course of a games' release cycle. When a new symbol image becomes desirable (as by modifying the game to holiday-reflective content), the table-specified software may include an app intended to introduce the new symbols to the public. After the gaming format has become popular and the game has become better known, a different software selection may be indicated.)

Presently, game discovery and other content-related applications are commonly performed by application software. Operating system (OS) software provides a variety of useful services—some of which (e.g., I/O) are commonly used in content-related applications. However, commercial OS software has not previously provided any services specific to content processing or identification. In accordance with a further aspect of the present technology, operating system software is provided to perform one or more services specific to content processing or identification.

In one particular implementation, an OS application programming interface (API) takes content data as input (or a pointer to a location where the content data is stored), and returns fingerprint data corresponding thereto. Another OS service (either provided using the same API, or another) takes the same input, and returns watermark information decoded from the content data. (An input parameter to the API can specify which of plural fingerprint or watermark processes is to be applied. Alternatively, the service may apply several different watermark and/or fingerprint extraction processes to the input data, and return resultant information to the calling program. In the case of watermark extraction, the resultant information can be checked for apparent validity by reference to error correction data or the like.)

The same API, or another, can further process the extracted fingerprint/watermark data to obtain XML-based content metadata that is associated with the content (e.g., text giving the title of the game, the name of the provider or designer, the intellectual property holder, etc.). To do this it may consult a remote metadata registry, such as maintained by a distal third party.

Such a content-processing API can establish a message queue (e.g., a playing/wagering queue) to which results of the fingerprint/watermark extraction process (either literally, or the corresponding metadata) are published. One or more application programs can monitor (hook) the queue—listening for certain identifiers. One app may be to alert to sizes of wagers, length of time in which gaming is active, and other relevant gaming information. When such content is detected, the monitoring app—or another—can launch into activity—logging the event, acting to complement the media content, offering a buying opportunity, offering side bets, offering a progressive jackpot wager, etc. Alternatively, such functionality can be implemented apart from the operating system. One approach is with a subscription model, by which some apps publish capabilities (e.g., looking for a particular type of gaming content event). By these arrangements, loosely-coupled applications can cooperate to enable a similar ecosystem.

One application of the present technology is to monitor media to which a user is exposed—as a background process. That is, unlike song identification services such as Shazam, the user need not take any action to initiate a discovery operation to learn the identity of a particular game or related game, but may request on-line transfer to that related game. (Of course, the user—at some point—must turn on the device, and authorize this background functionality.) Instead, the device listens for a prolonged period—much longer than the 10-15 seconds of Shazam-like services, during the course of the user's day. As content is encountered, it is processed and recognized. The recognition information is logged in the device, and is used to prime certain software to reflect exposure to such content—available the next time the user's attention turns to the device.

In some implementations the device can prime software applications with information that is based, at least in part, on the content identification data. This priming may cause an associated app to show a thumbnail corresponding to a gaming video for a game identified as similar by the processor or the player, readying it for selection. Likewise, a 90 second sample video clip may be downloaded to the iPod music player app—available in a "Recent Encounters" folder. An email from the game designers might be added to the user's email InBox. Such data is resident locally (i.e., the user needn't direct its retrieval, e.g., from a web site), and the information is prominent to the user when the corresponding app is next used—thereby customizing these apps per the user's content experiences.

Social media applications can serve as platforms through which such information is presented, and shared. The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

For purposes of this application, a social network is an on-line community defined by a first set of data, organized into an account in a mobile application or a set of web pages, that are controlled by and defining the interests, profile, images, video, audio, or other information of a first user (collectively first user data), and a second set of data, organized into an account in a mobile application or a set of web pages, each controlled by and defining the interests, profile, images, video, audio, or other information of a second user (collectively second user data), where the first user can selectively grant to the second user access to the first user data and/or where the second user can selectively grant to the first user access to the second user data. It should be appreciated that the selective granting of data access can be applied by any number of first users by and among any number of second users. It should further be appreciated that when a first user grants to the second user access to the first user data, the first user is "connected" to the second user.

For purposes of this application, a mobile platform is an operating system programmed to execute on a mobile device, such as a phone or tablet computer, and connect with a remotely hosted e-commerce store for enabling a user to access a plurality of applications. The operating system defines a plurality of procedures, calls, methods, and other programmatic tools which, if adopted and integrated into the applications, permit the application to be purchased, downloaded, and used on the mobile device.

Both the mobile platform and social network are further defined in that they provide users with a single point of purchase functionality. Even though each may provide access to thousands of products and services, primarily software of different types from different vendors, they provide users with a single point of purchase functionality that is typically actuated by just inputting an identifier, unique to the user of the mobile platform or social network, which triggers a purchase process by authorizing the use of a stored set of billing processes, such as a bank withdrawal or credit card charging process. In this manner, a user of the mobile platform or social network need not engage with multiple different billing systems or re-input billing information every time the user wishes to purchase a software application from a new or different vendor. The mobile platform and social network provide a single purchase functionality that is integrated into the software for hosting the social network and its e-commerce store and integrated into the software for the mobile device operating system and its remotely hosted e-commerce store.

For purposes of this application, a mini-game is any digital content which can be interacted with by a first user to create a challenge for a plurality of second users. A mini-game differs from a conventional wagering game or gaming event in that it typically only includes a single level, a single life, and/or a single interaction screen and is designed to obtain an output which is reformatted as a challenge to a plurality of second users, without placing value at risk. The term mini-game may include abbreviated versions of conventional games such as question and answer games, chain games, fantasy games, arcade games, online video games, bingo, racing games, sporting games, football, baseball, tennis, bowling, ping pong, boxing, basketball, rowing, sailing, shooting, archery, judo, equestrian, gymnastics, wrestling, skiing, hockey, volleyball, cycling, fencing, golf, dominoes, baccarat, word games, crosswords, Scrabble, role play, casino games, roulette, craps, dice games, canasta, chess, checkers, simulation games, mahjong, any card games, including poker, all fives, blackjack, old maid, bridge, pai gow, rummy, 21, crazy eights, or cribbage, or any variations thereof.

It should be appreciated that all of the gaming systems described herein are operated by hosting servers, executing programmatic code, communicating in a wired or wireless manner with programmatic code on a client device being operated by a user, such as a mobile phone, tablet computer, personal computer, laptop or other computing device.

In an embodiment, the gaming site of the present specification provides users with an option to play one or more wagering events or gaming events or mini-games with one or more virtual opponents via the gaming website, via a social networking website such as Facebook® system, or via a mobile phone operating system, such as Apple® iOS or Google®, Android® systems and the like. In an embodiment, in order to play via a smart phone, a user is prompted to download and install a gaming application by first opening the gaming site on the phone and subsequently clicking on a link provided therein, especially security and verification information components and functions of the gaming events.

In an embodiment, a user may elect to play the game provided by the hosting gaming site via their social network sites such as Facebook® system. In an embodiment, a user may perform a search for the gaming application on his/her Facebook® system page and commence gameplay via opening the application, while still being on Facebook® system. This feature allows the user to play with one or more of his/her Facebook® system friends that happen to be online at that time by inviting such friends to play. The invite may be sent to the accounts or profile pages of friends. The user may also post updates on his/her homepage notifying everyone, or his/her friends, a time and date when the user would be playing the online game, thereby allowing other individuals to join the user's game at the notified times.

While accessing the gaming application via a social networking site, such as Facebook® system, a user is informed that the application would be accessing the user's basic information which may be made available by the networking site. The online gaming system of the present specification uses this basic information, such as the user's name and photo, as well as the user's friends list in order to enable the user to see and play with online friends. The gaming application also requests permission to send emails to the user by using the email (or texting or instant messaging) provided by the user to the networking site, in order to send the user alerts on the receipt of gifts, neighbor invitations, and occasionally information on new features, games and special offers, including virtual goods. The user may specify whether the application can send e-mails. Further the user may change the permission granted at any time. The gaming application also requests permission to post to the user's profile page (or 'wall') on the networking site for sharing gaming information and rewards with friends. The user may specify whether the application can make such postings. In addition, the user is informed that the gaming application may access the user's profile information provided on the networking site. For example, the gaming application may obtain the user's birth date from the profile information provided to ensure that the user receives age-appropriate content from the gaming application.

The user may also choose to play a mini-game (e.g., non-wagering or social app) selected from a set of games hosted by the gaming website via the website itself. In this case, the user is required to log-in to a social network from within the gaming site, in order to enable play, gift-sharing, etc. with his/her friends. In one embodiment, if a user does not have an account on any social networking site, the user is prompted to create one prior to commencing gameplay.

Architecture Overview—In one embodiment, the online gaming system of the present specification provides a user, which may be an individual, a company, a partnership, a charity, or any other legal entity, with an option of initiating certain mini-games that, when played, interconnected personal playstations, electronic gaming machines or personal devices 1002 in FIG. 1A. ease or expand the number of individuals that are part of the users' social network. That social network is visually described as a tree, but it may take any form that has some element of hierarchy embedded within it where an initiating user (the trunk, community owner, or social network owner) is at the base and other members are either directly connected to the initiating user or indirectly connected to the initiating user through other users.

In one embodiment, the tree trunk represents the player that initiates the game, also known as the first user or the initiating user. In one embodiment, branches, also known as a second (or third, fourth, etc.) user or one who was invited to play the game by the another user, represent all players that choose to progress in the game by receiving and engaging in a mini-game challenge from another user and distributing mini-game challenges to another set of users. In another embodiment, leaves represent all players that choose to remain in the game by receiving and engaging in a mini-game challenge from another user but not distributing any challenges from mini-games themselves. In one embodiment, branches and limbs are used interchangeably. In one embodiment, several trees, or several communities, form a forest.

Mini-games and wagering event gaming may comprise multiple different types of content, as described above, and, within each type of content, multiple different formats. A format may comprise of several types of media, including but not limited to text, audio, images, or video media. In one embodiment, the content is a question and answer game that is passed along among the "initiating player" and "subsequent players". Thus, the content may comprise multiple different formats, including a multiple game content selector, multiple choice selections of virtual symbols (i.e. text, video and/or audio) or a series of images. An "initiating user" can select from many different types of content and corresponding formats through which their game is entered and for subsequent players to engage in. In addition, within each content type, there are several themes, which are genres or sub-genres. Different types of content, formats, symbol themes, and game themes are described below. While throughout this text, examples are provided with respect to "questions", it should be noted that this is for illustrative and descriptive purposes only and that any content type of any format may be used with the present invention as described in the present specification.

An intercom-flowchart may assist the general flow between participants in the mini-game described in the present specification. A user (also referred to as an "initiating user") requests to initiate a mini-game and creates a challenge for other users/players. The request may take the form of the user signing into the game, the user accessing the gaming site via their electronic device, and/or the user selecting a button or other indicator to start the game. For a first-time user, they may be routed to a sign-up screen. If the user is a return user that has already logged in, then they will be taken to the home screen. In response to the request, the system presents an initiating user with a first piece of content, in at least one of a plurality of formats, as described below, thereby starting the social network hierarchy.

In one embodiment, in step 106, the initiating user inputs their response to the first piece of content or first question, where the response generally relates to the initiating user. The first piece of content or first question is modified in accordance with that response, for subsequent users to answer. In one embodiment, and described in greater detail below, the response is format dependent. For example, the response may be a personal answer to a question, a preference, an opinion, a time score value or any other response appropriate to the format. For example, in a puzzle mini-game, the response may include something such as the "time to beat". If the response is something in the nature of "time to beat" then a "correct" response to that content would be a better time value (i.e. a shorter time spent to beat the game challenge).

The present specification may provide to a first user (the initiating user) a plurality of mini-games which that user can use to create a social network hierarchy which permits that first user to connect with and/or communicate directly with, all individuals within that social network hierarchy. Further, it should be noted that this hierarchy can be through dozens, hundreds, thousands, and an infinite number of levels, all of which may be communicated to or with by the initiating user. There is no requirement that this hierarchy be linear, in fact, as represented by the example of a tree, it can contain several branches and limbs all stemming from the initiating user.

When any player invites a subsequent player to become part of the social network hierarchy, the subsequent player has the choice of whether to opt-in. While a first player may personally know the initiating user, and responds to the content (and in this example, question) with the knowledge that he will be in that initiating user's network when he engages in the game, this may not be true for subsequent users such as the third player, fourth player, etc. That person may not know the initiating user and may not want to be part of their mini-game community. Thus, in one embodiment, an opt-in is provided. It should be noted herein that each mini-game and its participants form a "social network" or "community" and that these terms may be used interchangeably.

In step 110, the first player(s) is prompted to answer the modified first piece of content or question that is presented to them. If a first player(s) responds to the modified content (or answers the first question) correctly based upon the initiating user's personal response, the first player(s) is prompted to input their response to the original content (in one embodiment, the original first question), or a new piece of content (in one embodiment, a second question) which may be selected in the same manner as described above, and send that modified first question or modified new content (a second question) to one or more of his or her members (a second set of one or more receiving users, also referred to as second player(s)) to which he or she is connected on one or more social networking sites, so that the second player(s) can answer that question. The second set of one or more receiving users may be selected by the first player(s), may be randomly selected from the first player(s)'s list of friends or contacts, and/or may be selected from the first player(s)'s established followers or fans, as indicated within the gaming system. In a wagering format, individual players may agree to contribute to a pot or jackpot, and the pot is distributed among the players according to a standing on points, wins and the like. The distal processor/server may (where legal) take a commission from the pot for managing the gaming event.

Thus, the second player(s) receive(s) the content when the gaming site presents the first player's challenge, as described above, to be responded to by the second player(s). Alternatively, multiple pieces of additional content (or multiple second questions, in one embodiment) can be selected and sent out to multiple second players from, by, or on behalf of the first player(s). In another step, the second player(s) is prompted to respond to the content presented to them. Content that is correctly responded to enables the second player responding to the content to forward that content to a second set of one or more receiving users (or third player(s)), in the same manner described above. The goal of the mini-game is to keep the community growing as long as possible, from the initiating user to nth player(s).

Am APP operating system 10 of the present disclosure may include an APP operating device and an APP output device. The APP operating system having the above-mentioned configuration may output APP data of at least one APP executed in the APP operating device through the APP output device. According to various embodiments of the present disclosure, during the process of outputting APP data of at least one APP executed in the APP operating device through the APP output device, the APP output device may output APP data of at least some of APPs being executed in the APP operating device.

For example, assuming that five APPs are being operated in the APP operating device, APP data for at least one of the five APPs may be output through the APP output device. The APP operating device may output at least one running APP on the top layer while operating the five APPs and may support operation of the corresponding APPs in an execution status according to a user input. The APP operating device may maintain at least one APP in an activation status through background processing.

According to various embodiments of the present disclosure, the execution status may include at least one of a status in which the APP can be controlled according to an input signal in the APP operating device 100 and a status in which the APP is output on the top layer. The activation status may be a status in which the APP is not output on the top layer of a screen, or the APP is not operated according to an input signal although having been loaded in a memory. Among the APPs in the activation status, the APP having a widget function may be changed from the activation status to an execution status according to setting information. According to various embodiments of the present disclosure, the APPs in the activation status may be changed to the execution status by a user designation. Hereinafter, a memory may be an area in which information is recorded by a controller or data stored in a storage unit is loaded. For example, the memory may be a Random Access Memory (RAM) area, and/or the like. Such a memory may serve as a buffer in some cases.

The APP operating device corresponds to a device that stores at least one APP in the storage unit, activates the corresponding APP according to a user request, and thereafter provides an execution status selectively or in response to the user request. The APP operating device may transmit, to the APP output device 200, APP data for at least one APP during the execution status and the activation status according to a connection of the APP output device or a user control after the connection of the APP operating device to the APP output device. If the APP data is updated by operation of the corresponding APP, then the APP operating device may transmit the updated APP data to the APP output device.

The APP operating device may control operation of a specific APP according to at least one of an input signal from the APP output device and an input signal from an input unit included in the APP operating device. During this process, when the updated APP data is generated, the APP operating device may transmit the corresponding APP data to the APP output device. According to various embodiments of the present disclosure, the APP data may include at least one of image data and text data which can be output on a device display unit of the APP output device. Various configurations of the APP operating device for supporting an APP operating function according to various embodiments of the present disclosure will be described below more specifically with reference to FIG. 5.

The APP output device may be connected to the APP operating device through at least one of wired and wireless connection. The APP output device may receive APP data associated with at least one APP provided by the APP operating device and may output the received APP data to the device display unit. According to various embodiments of the present disclosure, during the process of the APP output device receiving APP data associated with at least one APP provided by the APP operating device and outputting the APP data to the device display unit, in a case in which the APP operating device provides a plurality of APP data, the APP output device may classify the APP data and control such that the APP data is output to the device display unit as an APP area. According to various embodiments of the present disclosure, the APP output device may include the device display unit having a larger display area than that of the APP operating device. The APP output device may output the plurality of APP areas in the corresponding display area without the APP areas overlapping each other. Alternatively, even if the APP areas partially overlap each other, the APP output device may provide a proper display space such that a user may easily operate the respective APPs.

Further, the APP output device may display an APP area larger than that displayed in the APP operating device for a specific APP. According to various embodiments of the present disclosure, the APP output device does not simply expand the APP area of the APP operating device. According to various embodiments of the present disclosure, the APP output device may provide an expanded area containing more data. For example, if the APP operating device has output a list containing ten items, the APP output device may output a list containing twenty items. During this process, the APP output device may also provide, for the twenty items, areas equal to or larger than those assigned to the respective items in the APP operating device.

Meanwhile, the APP output device may include a device input unit. The APP output device may transmit an input signal for a control of an APP operation, which is input through the device input unit, to the APP operating device. When receiving APP data updated by the transmitted input signal, the APP output device may update displaying of an APP area related to the corresponding updated APP data. Configurations of the above-described APP output device and functions thereof will be described below more specifically.

According to various embodiments of the present disclosure, while providing the above-described functions, the APP operating system may perform more diverse control for the APPs operated in the APP operating device through the APP output device. Further, the APP operating system transmits a user control using the APP output device to the APP operating device and allows the user control to be performed for the corresponding APP. Accordingly, even in the APP output device, the user may freely operate at least one APP installed in the APP operating device 100. Meanwhile, the APPs in the above description are various APPs provided by the APP operating device and may include various APPs such as an APP in an activation or execution status according to a user selection and an APP activated at a specific time point according to a user setting. For example, the above-described APPs may include at least one of a dial input APP for a telephone call, an audio file or video file reproducing APP, a file editing APP, a broadcast receiving APP, a gallery APP, a chatting APP, an alarm APP, a calculator APP, a phonebook APP, a schedule APP, a calendar APP, and/or the like.

In an example using an electronic gaming machine (EGM) there is of course a value-in-value out system. In operation of this example embodiment, the process may begin after the gaming system establishes a credit balance for a player (such as after an acceptor of the gaming system receives and validates physical currency or a physical ticket associated with a monetary value). The gaming system receives a game-initiation input (such as an actuation of a physical deal button or a virtual deal button via a touch screen) and, in response, places a wager on and initiates a play of a wagering game associated with a paytable. The paytable is determined based on the type of game being played and the wager (or in other embodiments the wagering game's denomination).

Such game-initiation input can include, by way of non-limiting examples, coin deposit and recognition slots, credit card or debit card readers (swipe and smart chip insertion and near-field communication chip reading), ticket-in-ticket-out (TITO) technology with a motor drive for receiving and an internal printer for providing tickets with coded content on value and security for recordation in a central gaming server, currency validators and provider with a camera to inspect currency and a two-way motor drive to pull and expel currency, similar to what is done with TITO systems. A gaming system using the underlying generic concepts of the invention may include, for example: a payment acceptor (including value-in-value out systems); a processor; and a memory device comprising instructions that, when executed, cause the processor to at least be responsive to a physical item being received via the payment acceptor (and/or initiation through a button or touchscreen with communication link to a credit/debit system) modify a credit balance based on a monetary value associated with the received physical item; and initiate a play of a wagering game responsive to receipt of a game-initiation input.

The APP operating device may include a communication unit, an input unit, an audio processing unit, a display unit, a storage unit, and a controller. According to various embodiments of the present disclosure, the APP operating device may further include a connection interface. In addition, the APP operating device may also further include an image sensor for image collection according to a design method. Moreover, the APP operating device may also further include various sensors as an input device such as an acceleration sensor or a proximity sensor, a motion sensor such as a gyro sensor, an illumination sensor, and/or the like.

Meanwhile, the connection interface corresponds to an interface to which at least one APP output device can be connected. For example, a smart TV, a smart monitor or another electronic device (e.g., terminal) may be connected to the connection interface of the APP output device. The APP output device, which will be described below, may include various input units such as a keyboard, a mouse, an electronic pen, a joy stick, a remote controller, and/or the like as a device input unit. Accordingly, the connection interface may not only output APP data related to at least one APP to the APP output device but may also transfer an input signal generated by the APP output device to the controller. In this case, the connection interface may perform both an output function of outputting APP data of the APP operating device to the APP output device, and an input function of transferring a user input signal collected by the APP output device to the controller.

The communication unit supports a communication function of the APP operating device. The communication unit supports formation of at least one communication channel for supporting APPs requiring communication among the above-described various APPs as well as a message service function, a webpage search function, a video call function, a voice call function, a data transmission/reception function, a cloud function, and/or the like of the APP operating device. The communication unit may include a mobile communication module in a case in which the APP operating device supports a mobile communication function. Further, the communication unit may include a broadcast receiving module in a case in which the APP operating device supports a broadcast receiving function. If the communication unit forms a specific communication channel and receives data through the corresponding communication channel, then the received data may be provided to the controller. The controller may provide the corresponding data to the corresponding APP to support an APP operation. According to various embodiments of the present disclosure, APP data provided for the corresponding APP operation may also be provided to the APP output device.

The input unit generates various input signals required for operation of the APP operating device. The input unit may be formed in the shape of a specific key such as a button key, a side key, a home key, and/or the like. While one APP is in an activation status, the input unit is operated as a configuration for generating an input signal for operation of the corresponding APP. If an input signal generated by a push of the input unit is transferred to the controller, then the controller may provide the corresponding input signal to a running APP.

Meanwhile, in a case in which the display unit is provided in the form of a touch screen supporting a touch function, the input unit may include the display unit 140. A touch event generated through the display unit is transferred to the controller 160, and the controller may apply the touch event to a running APP. If an APP operation is updated by an input signal generated through the input unit, then the controller may transfer APP data updated according to the update of the APP operation to the APP output device.

The audio processing unit processes various audio signals generated in a process of operating the APP operating device. For example, the audio processing unit may include a Speaker (SPK) to support an output of an audio signal generated or decoded in the APP operating device, and in addition or in the alternative, may include a Microphone (MIC) configured to collect audio signals so as to support a voice or video call function and a recording function.

Meanwhile, if the APP output device is connected to the connection interface. then the audio processing unit may output a guide sound or sound effect corresponding to (or otherwise indicating) the connection. If specific APP data is transmitted to the APP output device, the audio processing unit 130 may output a guide sound or effect sound corresponding to the transmission. The above-described function of outputting the guide sound may be omitted or otherwise configured according to a manufacturer design and/or a user selection or preferences.

The display unit outputs various functional screens required during operation of the APP operating device. For example, the display unit 140 may display a menu screen, a screen for operating a specific APP, a screen for operating a plurality of APPs, a full screen of a specific APP during operation of a plurality of APPs, and/or the like. According to various embodiments of the present disclosure, the display unit may output an APP operation screen activated according to a user selection. The APP operation screen may be output in a landscape mode or portrait mode on the display unit according to a setting of a user or a setting of the corresponding APP. The APP operation screen output on the display unit may output information updated by an input signal input from the input unit or the device input unit. The updated information as updated APP data may be transferred to the APP output device. The various screen interfaces as described above will be described below more specifically with reference to the accompanying drawings.

Meanwhile, the above-described display unit may include a touch panel and a display panel for support of an input function. Further, the display unit may include a pen touch panel for operation of an electronic pen. The touch panel may be a panel, such as a capacitive touch panel, a resistive touch panel, and/or the like capable of detecting a physical or electronical change by a user finger-touch. The touch panel is disposed on a front or rear surface of the display panel and provides, to the controller, position information by a user finger touch and gesture information according to a user finger movement. The display panel is an area in which screen elements are output. The display panel is mapped with the touch panel and outputs various screen elements. For example, the display panel may output an operation screen of a specific APP among a plurality of APPs being operated. The pen touch panel is disposed on a front or rear surface of the display panel, recognizes an electronic pen according to proximity of the electronic pen, and provides information according to a movement of the electronic pen to the controller. The touch pen panel may be provided in various forms according to characteristics of the electronic pen. For example, the pen touch panel may be formed of an electromagnetic induction type panel. The touch panel and the pen touch panel as described above may be used as the input unit of the APP operating device. Meanwhile, in a case in which the APP operating device is designed such that at least one of a finger touch function and a pen touch function is not included, the display unit may be implemented as a configuration in which at least one of the touch panel and the pen touch panel is not included.

The storage unit may store various application programs required for operation of the APP operating device and various APP data generated during the operation of the APP operating device. For example, the storage unit may store programs including an operating system required for the operation of the APP operating device. More particularly, the storage unit stores various APPs related to user functions, and provides the APPs to the controller in response to a user request such that a function of the corresponding APP may be operated. According to various embodiments of the present disclosure, the storage unit may include a plurality of APPs and may include an output support program as illustrated. Further, the storage unit may include at least one buffer storing APP data generated according to operation of the APPs. Meanwhile, in a case in which a predetermined area of the storage unit is not provided as a buffer, a separate buffer may be disposed in the controller.

According to various embodiments of the present disclosure, the plurality of APPs are application programs for supporting various functions installed in the APP operating device. The plurality of APPs may be provided in the form of an icon or a separate menu item to the display unit, or may be activated according to a user request or schedule information while being allocated to hot keys. For example, the plurality of APPs includes the afore-mentioned various APPs including a voice call APP, a video call APP, a cloud APP, a camera APP, a web connection APP, a game APP, and/or the like. Further, the plurality of APPs may also include a plurality of APPs for similar functions. For example, the plurality of APPs may include a plurality of browser APPs. Further, the plurality of APPs may include a plurality of APPs regarding the camera. In addition, the plurality of APPs may include a plurality of APPs for utilization of the APP output device. Accordingly, in a case in which the plurality of APPs are activated, the APP operating device 100 may support operation and processing for each of the APPs. More particularly, the APP operating device may apply an input signal to a specific APP and may transfer APP data updated according to the input signal to the APP output device.

According to various embodiments of the present disclosure, the output support program is a program for allowing APP data corresponding to at least one APP operated in the APP operating device to be output through the APP output device. The output support program may include a routine for loading at least one APP having received a request for activation in a memory, for example, a RAM, a routine for executing a designated specific APP among the loaded APPs, loading an operation screen of the executed APP in a frame memory or a frame buffer, and outputting the operation screen of the executed APP to the display unit, and/or the like. The frame memory or the frame buffer is a storage area allocated to the display unit and may be differentiated from a memory provided for the storage unit and the controller.

According to various embodiments of the present disclosure, the output support program may include a routine for determining a connection of the APP output device, a routine for transmitting APP data of at least some of APPs activated according to a setting or automatically to the connected APP output device, and/or the like. The output support program may include a routine for receiving an input signal for operating a specific APP from the APP output device, a routine for applying the received input signal to the operation of the corresponding APP, a routine for transmitting APP data updated according to the applying of the input signal to the APP output device, and/or the like.

According to various embodiments of the present disclosure, the output support program may include a routine for receiving an input signal from the input unit or the display unit having an input function, a routine for applying the received input signal to an APP displayed on the top layer or a specific running APP among the APPs, a routine for updating an operation screen of the corresponding APP, a routine for outputting the updated APP data to the APP output device, and/or the like. The output support program may include a routine for receiving an input signal generated according to a setting, a routine for determining an APP to which the corresponding input signal will be applied, a routine for applying the corresponding input signal to the corresponding APP, a routine for transmitting APP data updated according to the applying of the input signal to the APP output device, and/or the like. The output support program may include a routine for applying an input signal generated by the APP operating device to a running APP in the APP operating device, a routine for applying an input signal received from the APP output device to an APP outputting APP data to the APP output device, a routine for transmitting the corresponding APP data to which the input signal of the APP output device has been applied to the APP output device independently of the APP operation of the APP operating device, and/or the like.

According to various embodiments of the present disclosure, the output support program may include a routine for providing APP data to each of a plurality of APP output devices or a routine for distributing the APP data to the plurality of APP output devices, a routine for providing APP data according to a landscape or portrait mode for each of APPs to the APP output device, a routine for providing, to the APP output device, APP data for which a display mode of the corresponding APP is changed according to a signal, received from the APP output device, for requesting a change of a landscape or portrait mode, and/or the like. The output support program may include a routine for adjusting an APP area, which will be displayed according to an APP operation, in response to a request of the APP output device, a routine for adjusting a display buffer of the corresponding APP according to the change of the APP area, a routine for adjusting data allocation according to the adjustment of the display buffer, and/or the like.

The connection interface is a configuration for a connection with an APP output device which can be connected to the APP operating device. The connection interface may support both a wired manner and a wireless manner. Accordingly, the connection interface may include a wired serial connection interface such as a Universal Serial Bus (USB) interface, a Universal Asynchronous Receiver/Transmitter (UART) interface, and/or the like. Further, the connection interface may include a wireless connection interface such as, for example, a Bluetooth connection interface, a Zigbee connection interface, a Ultra WideBand (UWB) connection interface, a Radio Frequency IDentification (RFID) connection interface, an infrared ray connection interface, a Wireless Application Protocol (WAP) connection interface, a Near Field Communication (NFC) connection interface, and/or the like. Namely, the connection interface may include various types of communication connection interfaces that can be connected with the APP operating device. The connection interface may include a plurality of ports and a plurality of wireless communication modules for a connection with a plurality of APP output devices as well as a single APP output device.

The controller supports processing of various signals and data related to operation of the APP operating device. Namely, if the controller receives a request for activation of a specific APP, then the controller performs operation of the specific APP and supports an output of an APP operation screen on the display unit. According to various embodiments of the present disclosure, during the process of the controller performing an operation of the specific APP and supporting an output of the APP operation screen on the display unit, according to setting information or a user request, the controller may support an adjustment of a size, the number, a display direction, an update of an APP area to be displayed, and/or the like according to the operation of the specific APP and may support a control of the corresponding APP according to an input signal. According to various embodiments of the present disclosure, the controller may include configurations.

According to various embodiments of the present disclosure, the APP operating unit may switch a specific APP from an activation status to an execution status by setting information, and may control APP operation according to the corresponding information. According to various embodiments of the present disclosure, the APP operating unit may not execute the specific APP in the activation status, and may provide, through an interrupt signal form, that an event related to the corresponding APP has been generated.

Meanwhile, if the APP operating unit receives a request for execution of a specific APP from the input device including at least one of the input unit and the display unit supporting the input function, the APP operating unit may support the execution of the corresponding APP. According to various embodiments of the present disclosure, if the APP is in an inactivation status, then the APP operating unit may load the APP in a memory and execute the APP. If the APP is in an activation status, the APP operating unit may switch the APP from the activation status to an execution status and may support an output of APP data according to the operation of the corresponding APP on the display unit.

Further, if the APP operating unit receives an input signal for operating the specific APP from the input device or the APP output device, then the APP operating unit may control application of the corresponding input signal to the corresponding APP. According to various embodiments of the present disclosure, the APP operating unit may control application of the input signal generated by the input device of the APP operating device to the APP running as a default. The APP operating unit may control the input signal received from the APP output device to be applied to an APP designated by the corresponding input signal. According to various embodiments of the present disclosure, the APP operating unit may control the input signal received from the APP output device to be processed through background processing. Further, the APP operating unit may change a status of the APP designated by the input signal received from the APP output device to an execution status, output the corresponding APP data to the display unit, and support application of the input signal.

According to various embodiments of the present disclosure, if the APP operating unit receives an event for a landscape or portrait mode of the APP operating device, then the APP operating unit may apply the event to an execution screen. According to various embodiments of the present disclosure, if a landscape mode or portrait mode is designated as a default mode for a specific APP, then the APP operating unit may support maintenance of the corresponding landscape mode or portrait mode irrespective of a horizontal or vertical status (e.g., the orientation) of the APP operating device. Further, while a specific APP is being operated in a landscape or portrait mode, if another APP enters an execution status and the running APP is changed to an activation status, the APP operating unit may maintain the landscape or portrait mode shortly before the operation of the corresponding APP.

Accordingly, APP data of the specific APP may be stored in a memory while being maintained in the status in which the specific APP has been executed, for example, in the landscape or portrait mode. Meanwhile, the APP operating unit may change a screen of the specific APP from a landscape mode to a portrait mode or from a portrait mode to a landscape mode in response to a request of the APP output device. According to various embodiments of the present disclosure, the four screens of APPs being performed through background processing as well as the screen of the specific APP being output on the display unit, the APP operating unit may control a change of a landscape or portrait mode of the APP differentiated by the input signal from the APP output device.

The APP operating unit may also apply both the input signal from the input device and the input signal from the APP output device to a single APP. The APP operating unit may sequentially apply the respective input signals to the single APP according to a reception time of the input signals to be transferred.

The APP operating unit may set an output size of a specific APP to be larger than an area of the display unit of the APP operating device. For example, assuming that the display unit has a full size of 10×10, the APP operating unit may output a screen having a size of 10×10 according to the received input signal and may change a size of the running APP to a size of 20×20.

According to various embodiments of the present disclosure, the APP operating unit may allocate additional data to the expanded area. The APP operating unit may perform data processing for an area which is not currently displayed on the display unit through background processing to thereby support a data update of the corresponding area. Consequently, the APP operating unit may set the APP screen to have a larger size in the memory, and may perform data writing suitable for the set size of the APP screen. Meanwhile, the APP operating unit may support an output of only the area corresponding to the size of the display unit and may support data updating for the remaining area. The APP operating unit may control a memory allocation size for an adjustment of the above-described APP screen. Namely, the APP operating unit may expand and allocate the memory area to write data having a size larger than the display unit.

The APP data collecting unit collects APP data generated while the APP operating unit operates at least one APP. For example, if APP data is recorded in the memory by APPs activated by the APP operating unit, then the APP data collecting unit may collect the corresponding APP data. According to various embodiments of the present disclosure, the APP data collecting unit may collect the whole APP data of all APPs recorded in the memory. Alternatively, the APP data collecting unit may also collect only some of the APP data of all the APPs. For example, if five APPs are in an activation status, then the APP data collecting unit may collect the respective five APP data. Alternatively, the APP data collecting unit may collect only some APP data selected to be transmitted to the APP output device among the five APP data.

Meanwhile, if the APP data is updated after the APP data collecting unit collects the respective APP data, then the APP data collecting unit may collect only the updated APP. The respective APP data collected by the APP data collecting unit may be transferred to the APP output device through the connection interface. According to various embodiments of the present disclosure, the APP data collecting unit may provide, to the APP output device, the APP data including index information or identification information to be differentiated by the APP output device. Further, the buffer operating unit may allocate separate distinguishable buffers so as to provide the respective APP data to the APP output device. The APP data collecting unit may record the corresponding APP data in the respective buffers to provide the APP data to the APP output device. For example, the buffer operating unit may allocate buffers to five APPs, respectively, and the APP data collecting unit may record APP data of the APPs in the respective buffers. According to various embodiments of the present disclosure, during the process of the buffer operating unit allocating buffers for the respective APP data, the buffer operating unit may allocate a new buffer when a new APP is activated, and may withdraw the allocated buffer when the APP in an activation status is terminated.

The APP data transmitting unit may transmit the APP data collected by the APP data collecting unit to the APP output device. Further, the APP data transmitting unit may transmit the updated APP data collected by the APP data collecting unit to the APP output device. According to various embodiments of the present disclosure, the APP data transmitting unit may control formation of a communication channel with the APP output device connected to the connection interface. According to various embodiments of the present disclosure, the APP data transmitting unit may control formation of at least one of a wired communication channel and a wireless communication channel. The APP data transmitting unit may use at least one communication channel for transmission of the respective APP data. For example, the APP data transmitting unit may create at least one of various communication channels including a WiFi communication channel, a USB communication channel, a UART communication channel, a BT communication channel, and/or the like between the APP data transmitting unit and the APP output device. The APP data transmitting unit may transmit some of the APP data to the APP output device through a USB communication channel and may transmit other APP data to the APP output device through a BT communication channel. Further, the APP data transmitting unit may transmit the remaining APP data to the APP output device through a WiFi communication channel, a UART communication channel, and/or the like. The technology of U.S. Pat. No. 9,311,167 (Kim) enabling such APPS is also incorporated herein by reference.

The present disclosure has been so far described with reference to exemplary embodiments thereof. It is to be meant that each one of the technical solutions implemented in the disclosed embodiments, herein described by way of example, may advantageously be combined, in different way with respect to what described, with the other ones, to create additional embodiments, belonging to the same inventive core and however all within the protective scope of the claims.

The player input controls on electronic gaming machines or table games may have unique motion limitation software such that once a card has been positioned by a player, no other playing may be transposed between positions or hands. This is a systemic improvement over physical playing cards where dealers or players may attempt to manipulate card positions.

The invention claimed is:

1. A gaming system, comprising:

a deck of cards, each card in said deck having a rank;

a gaming table comprising:

a surface, said surface having:

three card-placement areas, wherein each of said card-placement areas is configured to receive at least one of said cards face-down; and a plurality of user-playing areas, each user-playing area comprising three card-placement indicators and a wagering indicator, wherein each card placement indicator is uniquely associated with one of said card-placement areas, wherein said wagering indicator is configured to associate a credit value with at least one of said card-placement areas, wherein said gaming table is configured to allow a user to select one of said card-placement areas by interacting with said card-placement indicators and provide a credit value associated with the selected card-placement area by interacting with said wagering indicator; and a symbol generation apparatus configured to randomly generate a symbol associated with one of said card-placement areas, wherein said gaming table is configured to provide a rank of the card placed on the card-placement area associated with said symbol and allow the user to either keep said credit value the same or increase said credit value by interfacing with said wagering indicator.

2. The gaming system of claim 1, wherein said gaming table is further configured to provide an award value for the user, wherein said award value is determined by comparing the rank of the card associated with said symbol with a rank of each of the two other cards.

3. The gaming system of claim 1, wherein said deck of cards comprises a standard deck of fifty-two cards.

4. The gaming system of claim 1, wherein said symbols are non-numerical symbols.

5. The gaming system of claim 4, wherein said symbols are colors.

6. The gaming system of claim 1, wherein said symbol generation apparatus is a die.

7. The gaming system of claim 1, wherein said symbol generation apparatus is a spinning wheel.

8. The gaming system of claim 1, wherein said symbol generation apparatus is a digital screen, wherein said symbol is displayed on the screen.

9. The gaming system of claim 1, wherein said wagering indicator is configured to indicate that the credit value is either doubled or tripled.

10. A method of providing a game, comprising:

providing a deck of cards, each card in said deck having a rank;

providing a gaming table with a surface, wherein said surface comprises:

three card-placement areas for positioning said cards, and a plurality of user-playing areas, wherein each user-playing area comprises three card-placement indicators and a wagering indicator, wherein each card placement indicator is uniquely associated with one of said card-placement areas;

providing at least one of said cards in each of said card-placement areas face down;

providing a first selectable option to a user, wherein the user is allowed to select one of said three card-placement areas by physically interacting with said card-placement indicators;

providing a second selectable option to the user, wherein the user is allowed to provide a credit value associated with the selected card-placement area by physically interacting with said wagering indicator;

generating a symbol associated with one of said card-placement areas, wherein said symbol is randomly generated by using a symbol generation apparatus;

providing a rank of the card placed on the card-placement area associated with said symbol;

providing a third selectable option to the user, wherein the user is allowed to either keep said credit value the same or increase said credit value by physically interfacing with said wagering indicator;

providing a rank of each of the two remaining cards; and providing an award value to the user if the rank of the card associated with said symbol is higher than the rank of each of the two other cards.

11. The method of claim 10, wherein said deck of cards comprises a standard deck of fifty-two cards.

12. The method of claim 10, wherein said symbols are non-numerical symbols.

13. The method of claim 12, wherein said symbols are colors.

14. The method of claim 10, wherein said symbol generation apparatus is a die.

15. The method of claim 10, wherein said symbol generation apparatus is a spinning wheel.

16. The method of claim 10, wherein said symbol generation apparatus is a digital screen, wherein said symbol is displayed on the screen.

17. The method of claim 10, wherein said wagering indicator is configured to indicate that the credit value is either doubled or tripled.

* * * * *